United States Patent
Bang et al.

(10) Patent No.: US 11,605,808 B2
(45) Date of Patent: Mar. 14, 2023

(54) METHOD FOR PREPARING CATHODE ACTIVE MATERIAL

(71) Applicant: INDUSTRY-UNIVERSITY COOPERATION FOUNDATION HANYANG UNIVERSITY ERICA CAMPUS, Ansan-Si (KR)

(72) Inventors: Jin Ho Bang, Ansan-si (KR); Moo Dong Lee, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 74 days.

(21) Appl. No.: 16/959,173

(22) PCT Filed: Nov. 26, 2018

(86) PCT No.: PCT/KR2018/014582
§ 371 (c)(1),
(2) Date: Jun. 30, 2020

(87) PCT Pub. No.: WO2019/135490
PCT Pub. Date: Jul. 11, 2019

(65) Prior Publication Data
US 2020/0335770 A1    Oct. 22, 2020

(30) Foreign Application Priority Data
Jan. 5, 2018    (KR) .................. 10-2018-0001499

(51) Int. Cl.
| | |
|---|---|
| H01M 4/00 | (2006.01) |
| H01M 4/1391 | (2010.01) |
| H01M 4/04 | (2006.01) |
| H01M 4/131 | (2010.01) |
| H01M 10/0525 | (2010.01) |
| H01M 4/02 | (2006.01) |

(52) U.S. Cl.
CPC ....... H01M 4/1391 (2013.01); H01M 4/0471 (2013.01); H01M 4/131 (2013.01); H01M 10/0525 (2013.01); H01M 2004/021 (2013.01)

(58) Field of Classification Search
CPC ...................................................... H01M 4/00
See application file for complete search history.

(56) References Cited

U.S. PATENT DOCUMENTS

| | | | |
|---|---|---|---|
| 2016/0079595 A1 | 3/2016 | Sun et al. | |
| 2019/0097227 A1 | 3/2019 | Bang et al. | |

FOREIGN PATENT DOCUMENTS

| | | | | |
|---|---|---|---|---|
| CN | 105209382 A | * | 12/2015 | ............ B01J 23/002 |
| JP | 2016-201209 | | 12/2016 | |

(Continued)

OTHER PUBLICATIONS

"Kinetic evolution during the laser/thermal preparation of Mn4O4 from MnCO3", I Ursu, Rodica Alexandrescu, I N Mihiilescu, I Morjan, V Jianu, and C Popescu, J. Phys. B: At. Mol. Phys. 19, L825-L829, (Year: 1986).*

(Continued)

*Primary Examiner* — David P Turocy
*Assistant Examiner* — Mohammad Mayy
(74) *Attorney, Agent, or Firm* — Finch & Maloney PLLC

(57) ABSTRACT

A method for preparing a cathode active material is provided. The method for preparing a cathode active material can comprise the steps of: preparing a first metal oxide; preparing a second metal oxide having an oxygen ratio lower than that of the first metal oxide by heat treating the first metal oxide in a nitrogen-containing gas atmosphere; and preparing a lithium metal oxide by firing the second metal oxide and a lithium salt.

13 Claims, 35 Drawing Sheets

(56) References Cited

FOREIGN PATENT DOCUMENTS

| KR | 10-2010-0107788 | 10/2010 |
| KR | 10-2011-0110701 | 10/2011 |
| KR | 10-2012-0021716 | 3/2012 |
| KR | 10-2012-0032803 | 4/2012 |
| KR | 10-2013-0138523 | 12/2013 |
| KR | 10-2017-0135700 | 12/2017 |
| WO | 2014/193204 | 12/2014 |
| WO | 2017/209517 | 12/2017 |

OTHER PUBLICATIONS

"Preparation of submicrocrystal LiMn2O4 used Mn3O4 as precursor and its electrochemical performance for lithium ion battery", Bao-Sheng Liu, Zhen-Bo Wang, Yin Zhang, Fu-Da Yu, Yuan Xue, Ke Kea, Fang-Fei Li, Journal of Alloys and Compounds 622, 902-907, (Year: 2015).*

"Thermal Analysis of Manganese Dioxide in Controlled Atmospheres", D. M. Tinsley and J. H. Sharp, Journal of Thermal Analysis, vol. 3, 43-48, (Year: 1971).*

"Facile Synthesis of Porous Mn2O3 Microspheres as Anode Materials for Lithium Ion Batteries", Hao Zheng, Lin Li, Lin Lu, Qing Zhang, Shan Xu, Chuanqi Feng, and Shiquan Wang, (Year: 2016).*

CN-105209382-A, English translated (Year: 2015).*

Hu et al., "Syntheses of LiMn2O4 Nanoparticles with Nano-Size Precursor and Its Electrochemistry Performance", Journal of Nanoscience and Nanotechnology, vol. 13, pp. 2262-2265 (2016).

Zheng et al., "Facile Synthesis of Porous Mn2O3 Microspheres as Anode Materials for Lithium Ion Batteries", Journal of Nanoscience and Nanotechnology, vol. 16, pp. 698-703 (2016).

* cited by examiner

[Fig. 1]
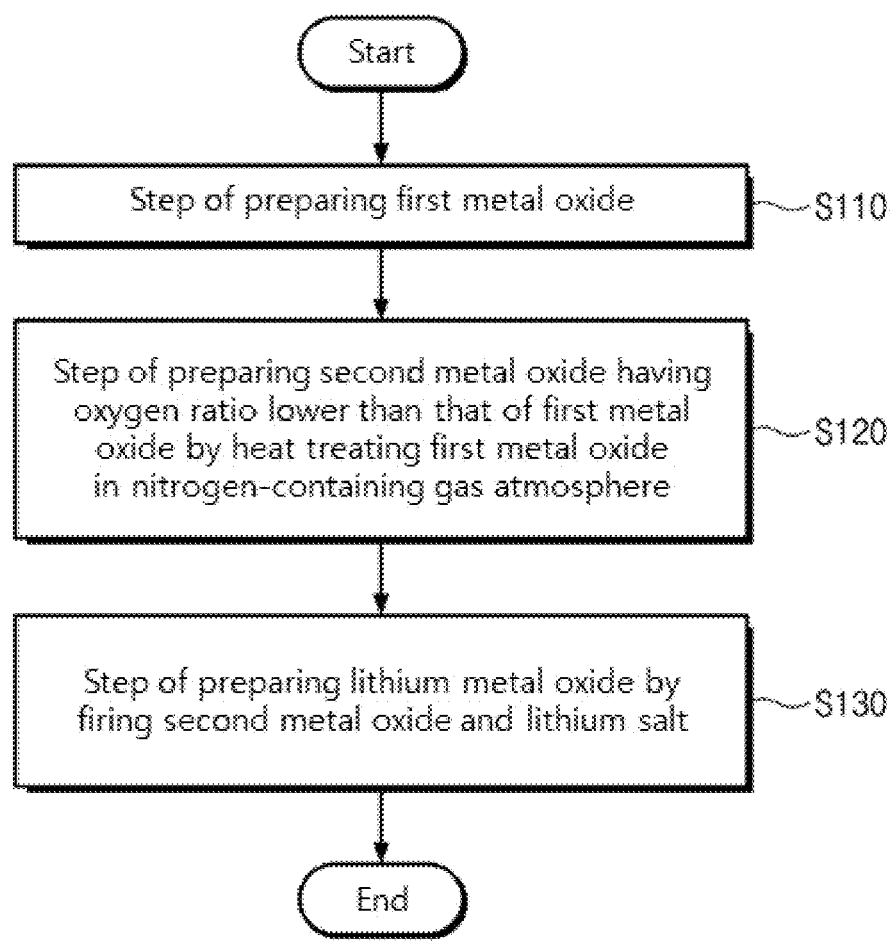

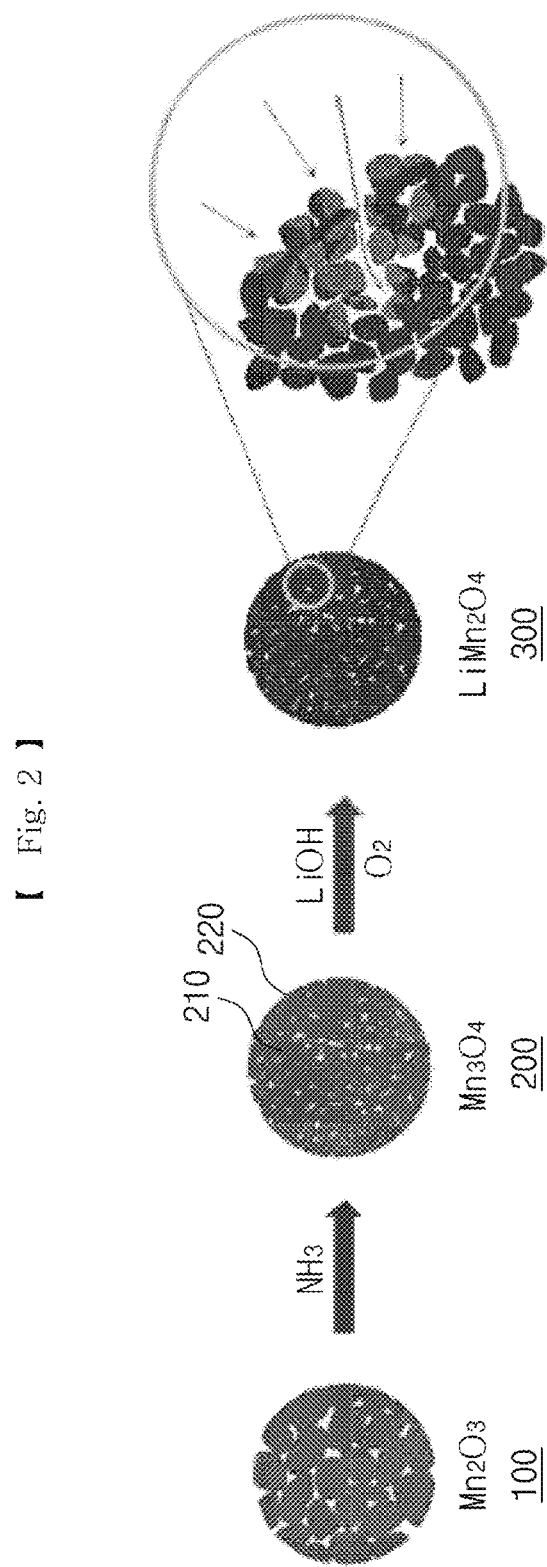

[Fig. 3]
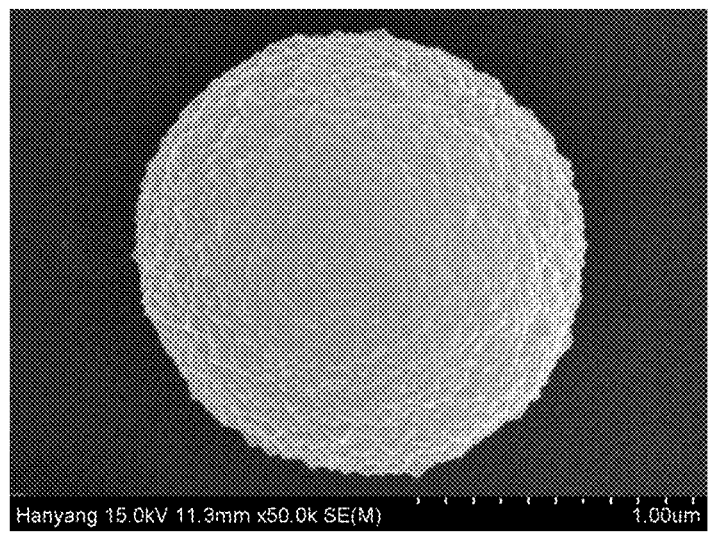

[Fig. 4]
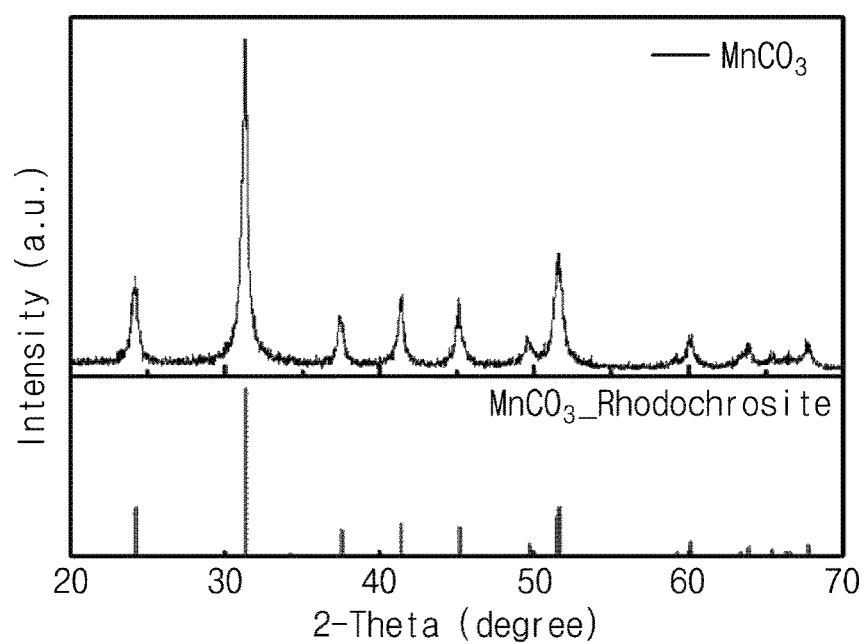

[Fig. 5]
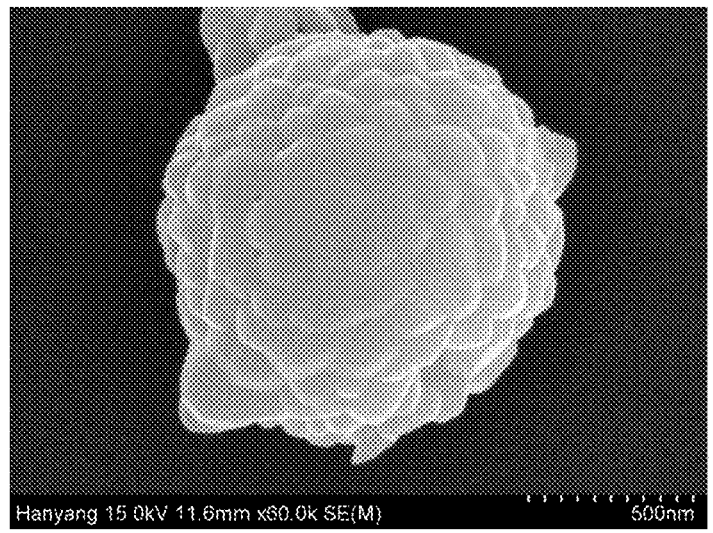

[Fig. 6]
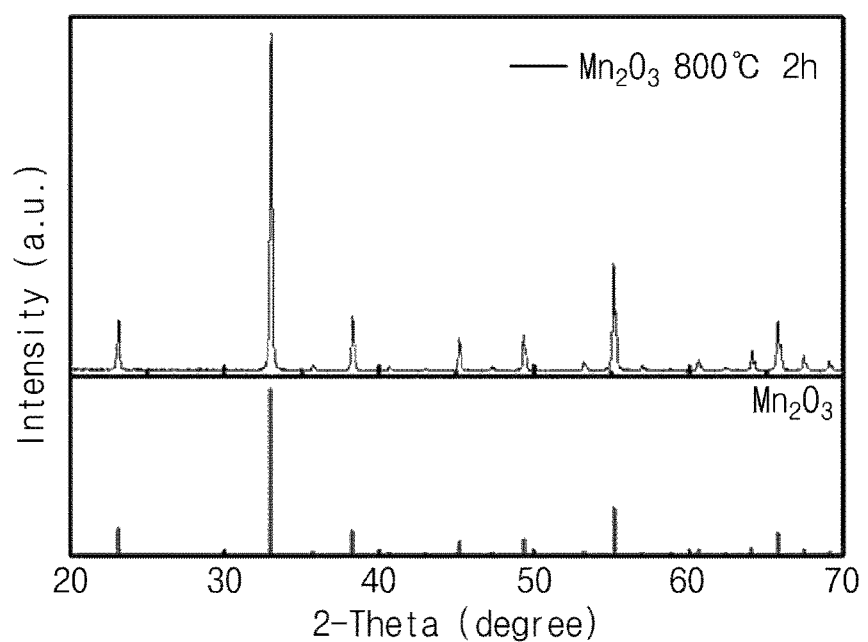

[Fig. 7]
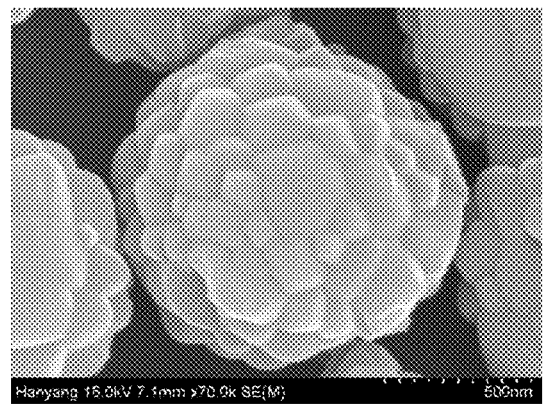
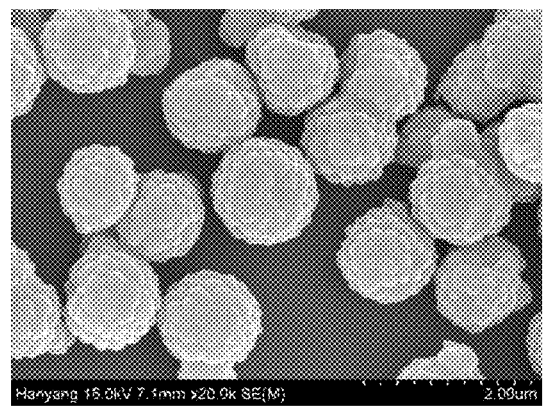

[Fig. 8]
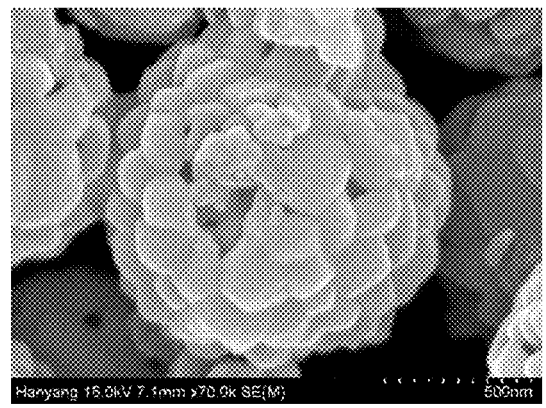
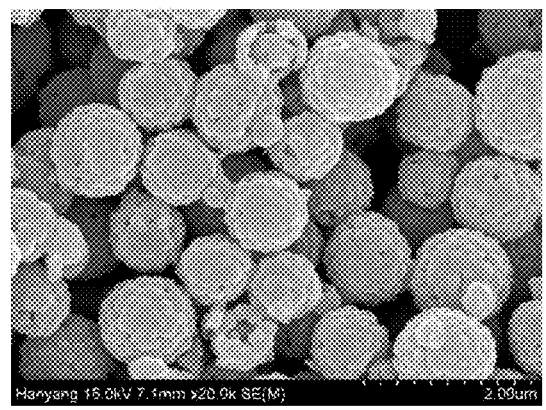

[Fig. 9]
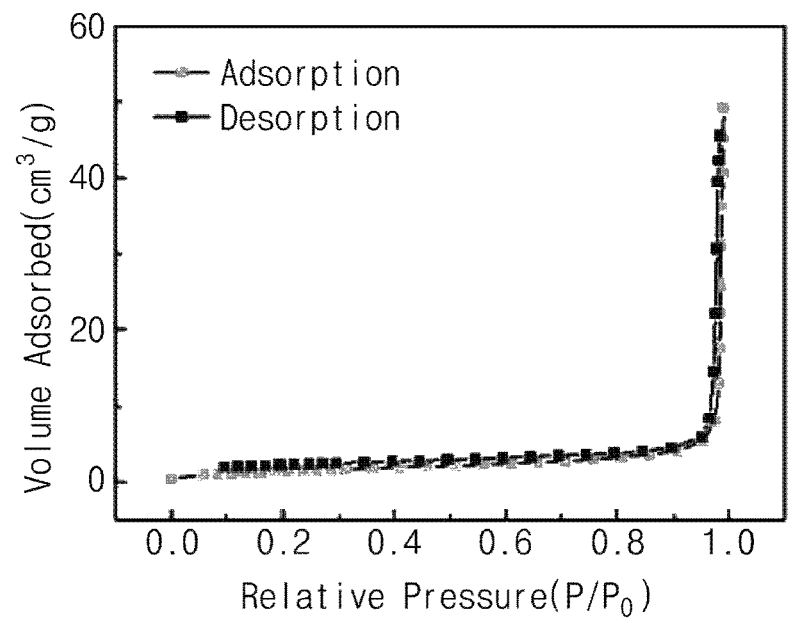
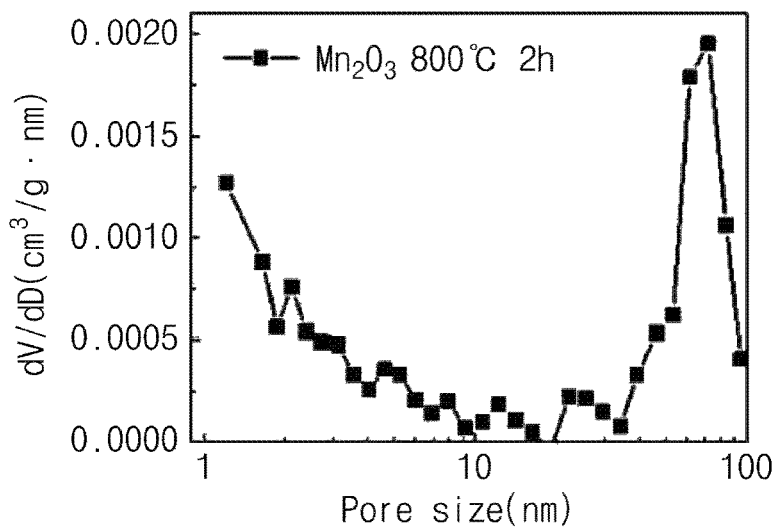

[Fig. 10]
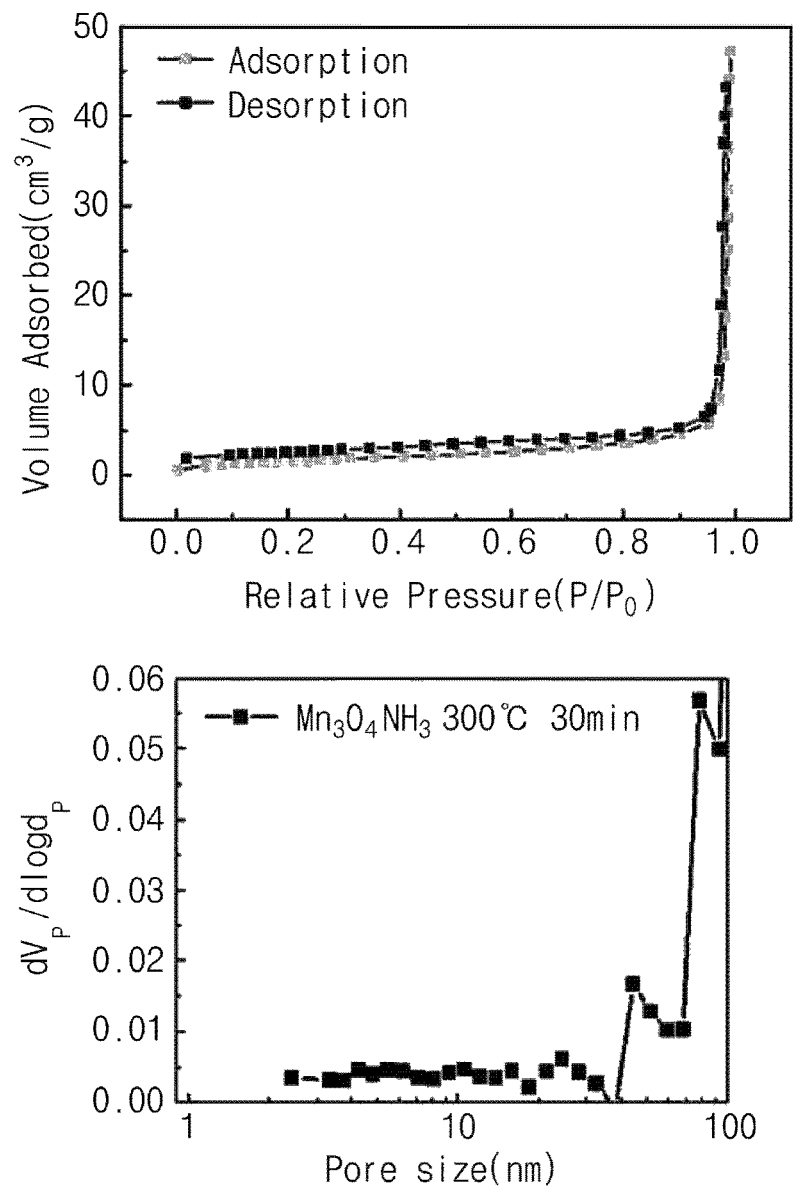

[Fig. 11]
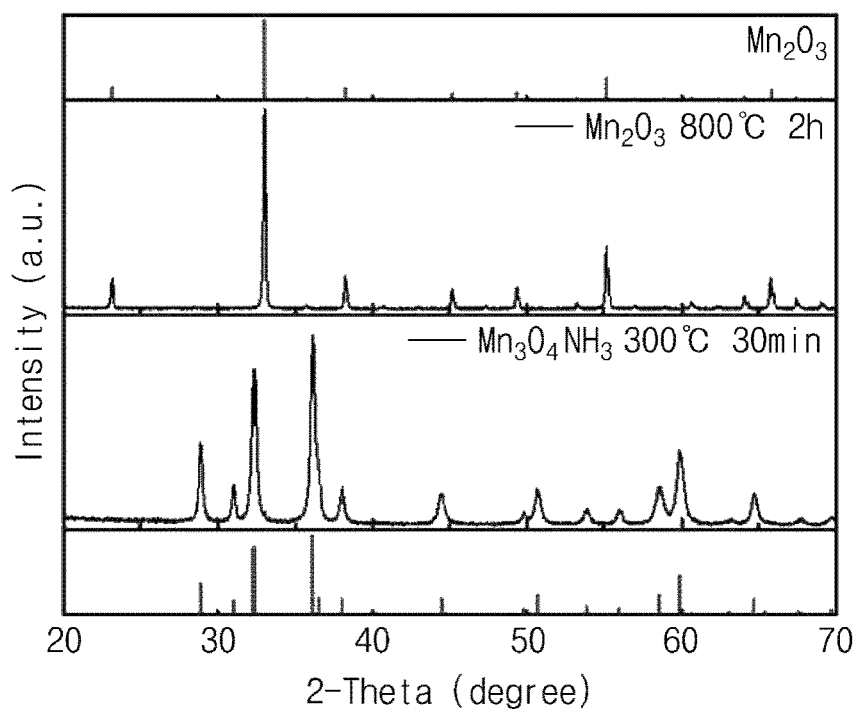

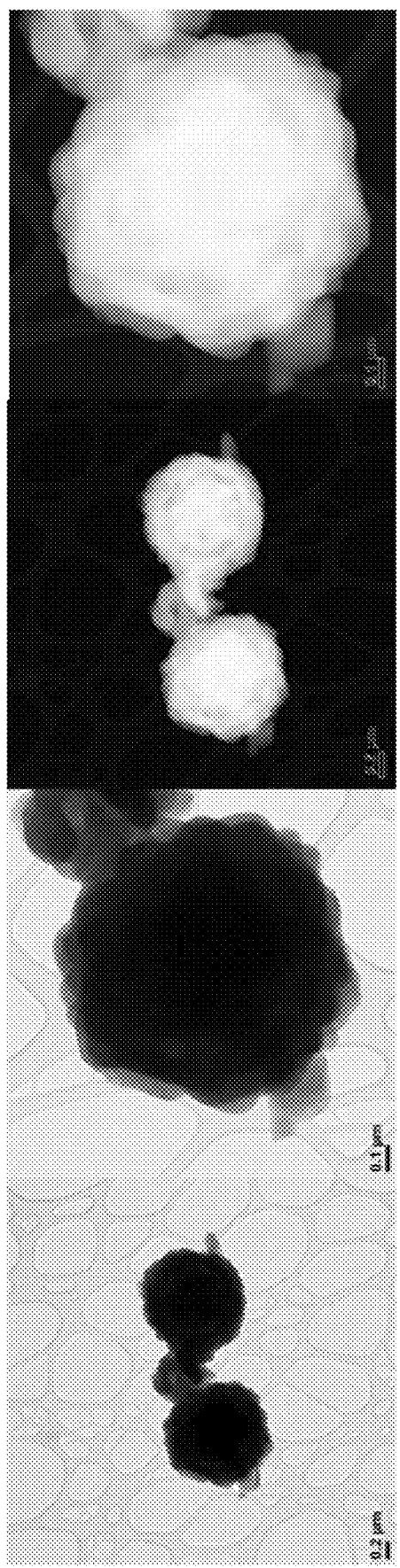
[ Fig. 12 ]

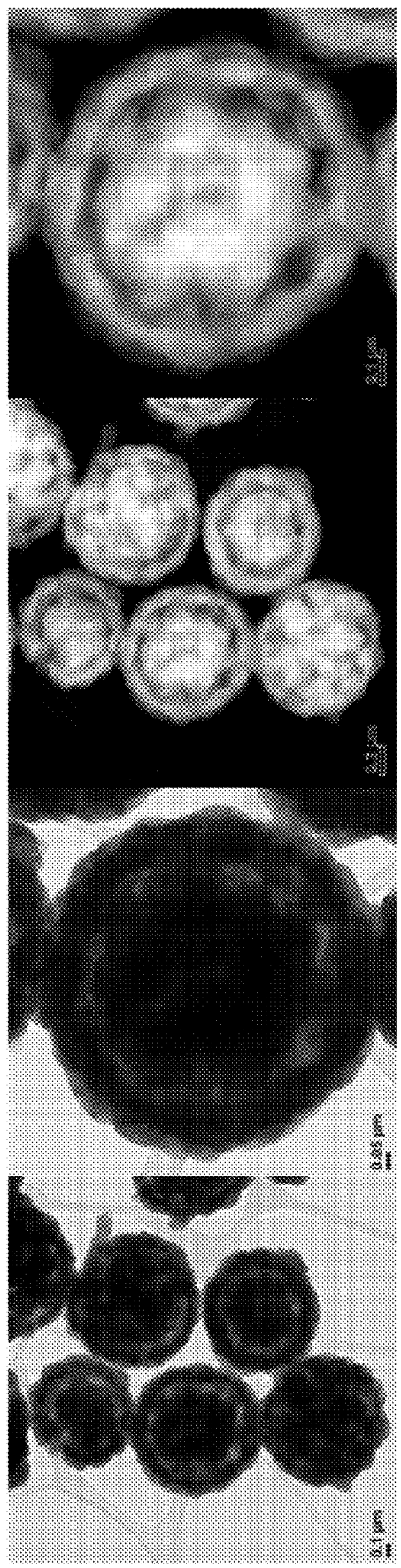
[ Fig. 13 ]

[Fig. 14]
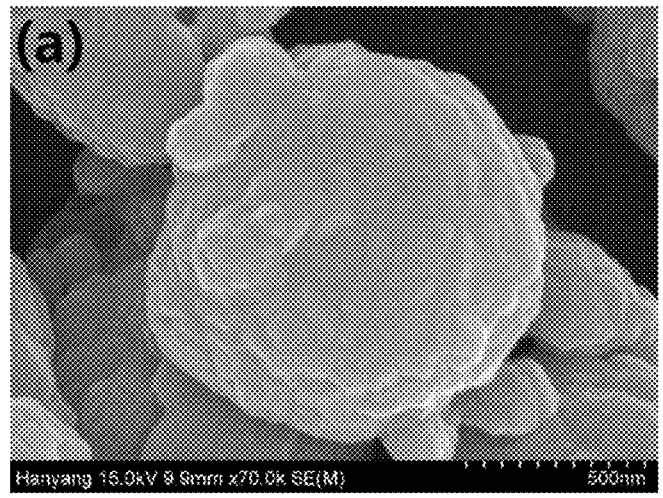
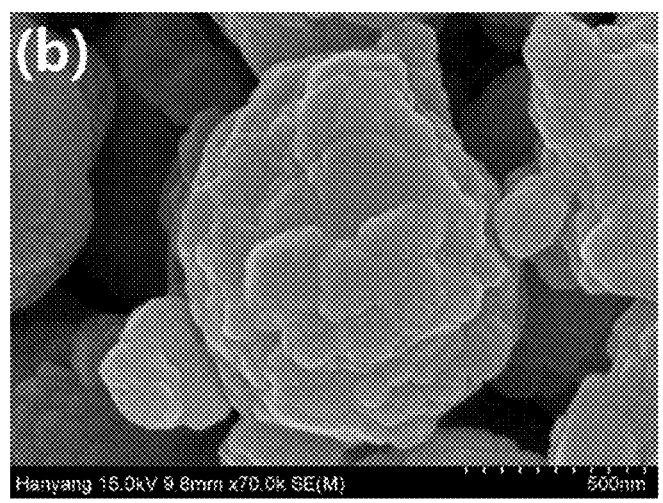
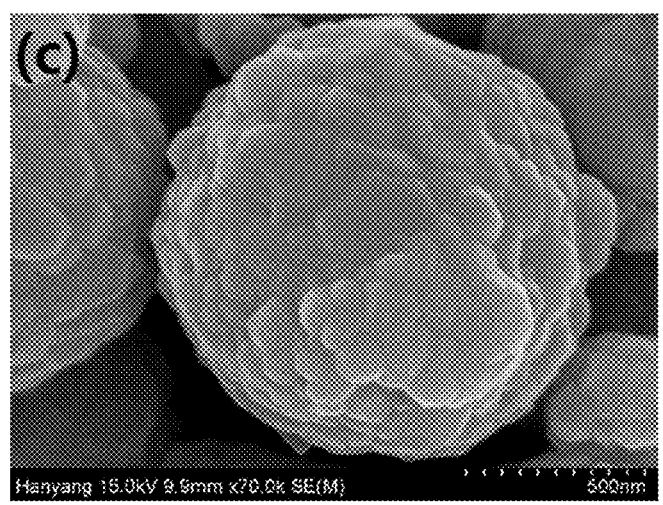

[Fig. 15]
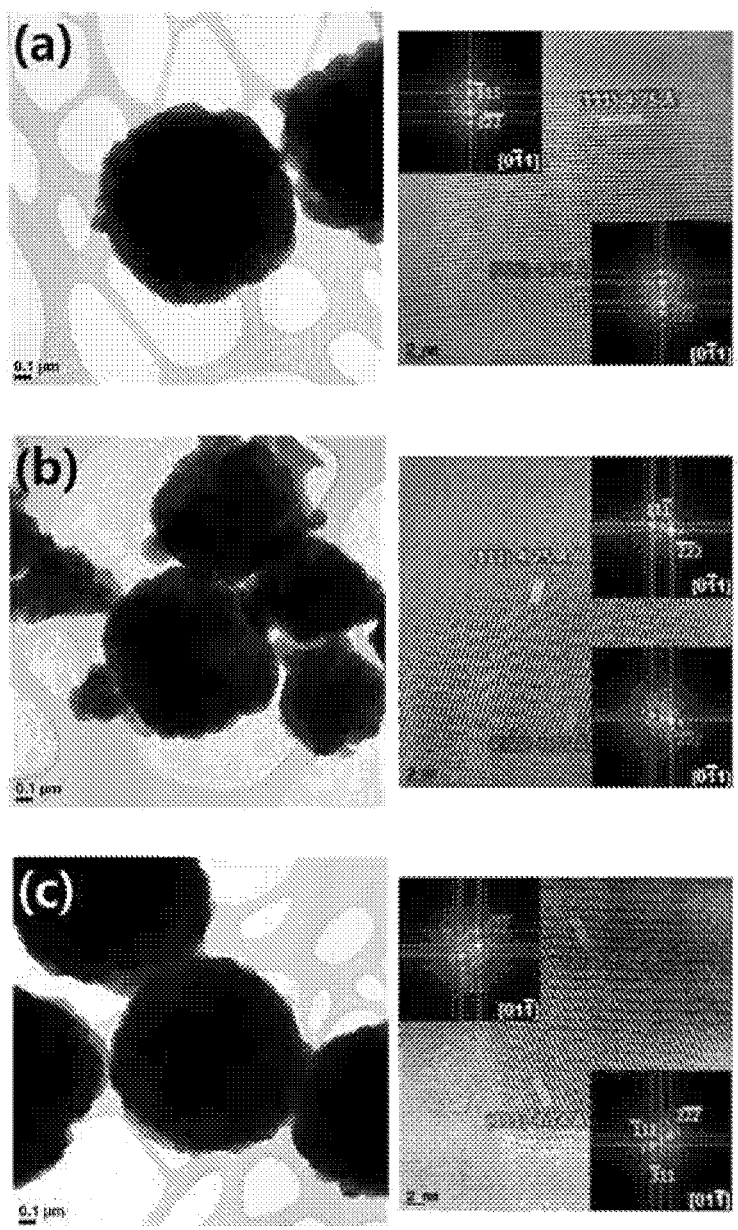

[Fig. 16]
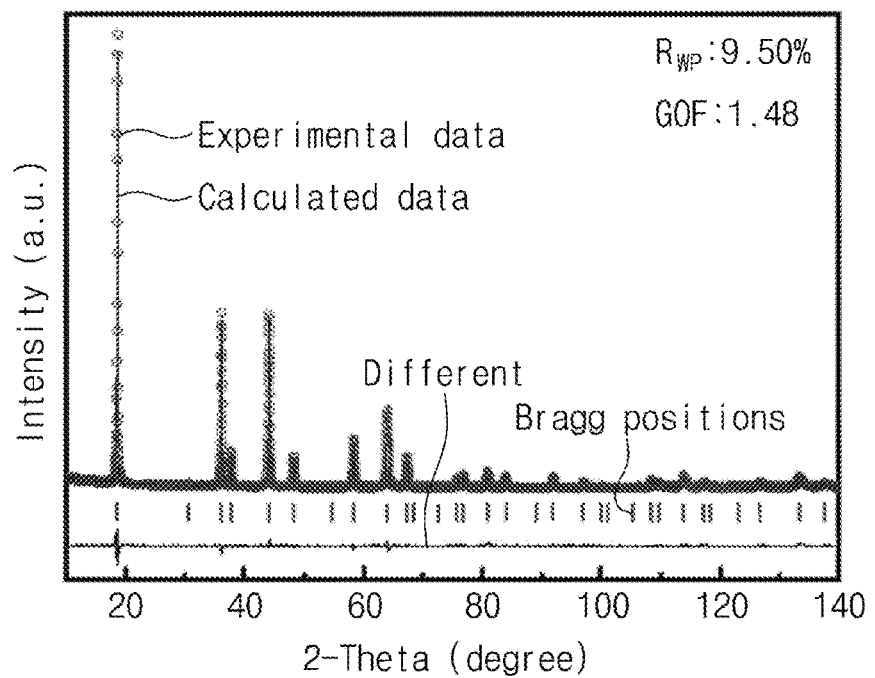

[Fig. 17]
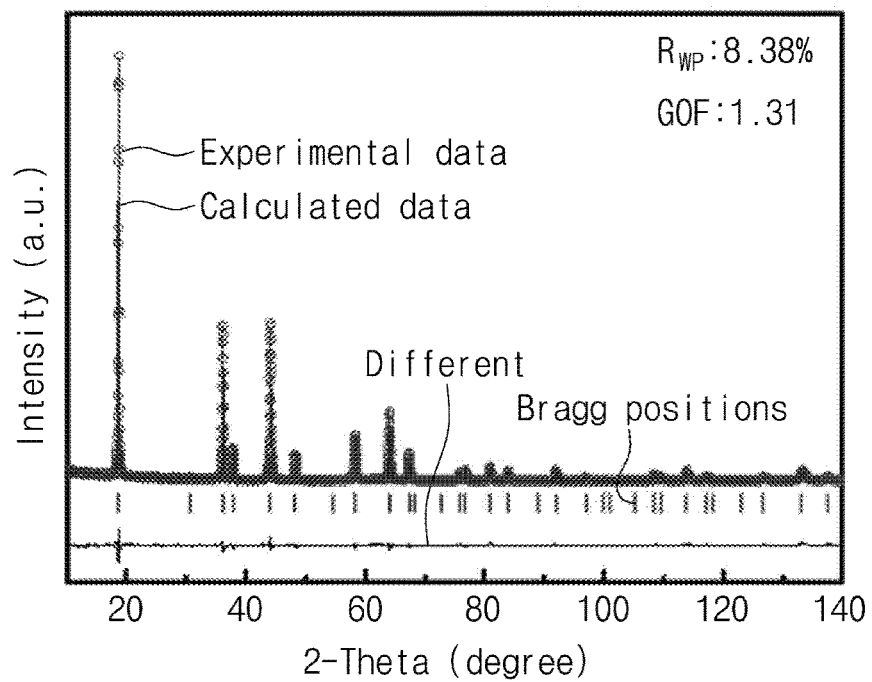

[Fig. 18]
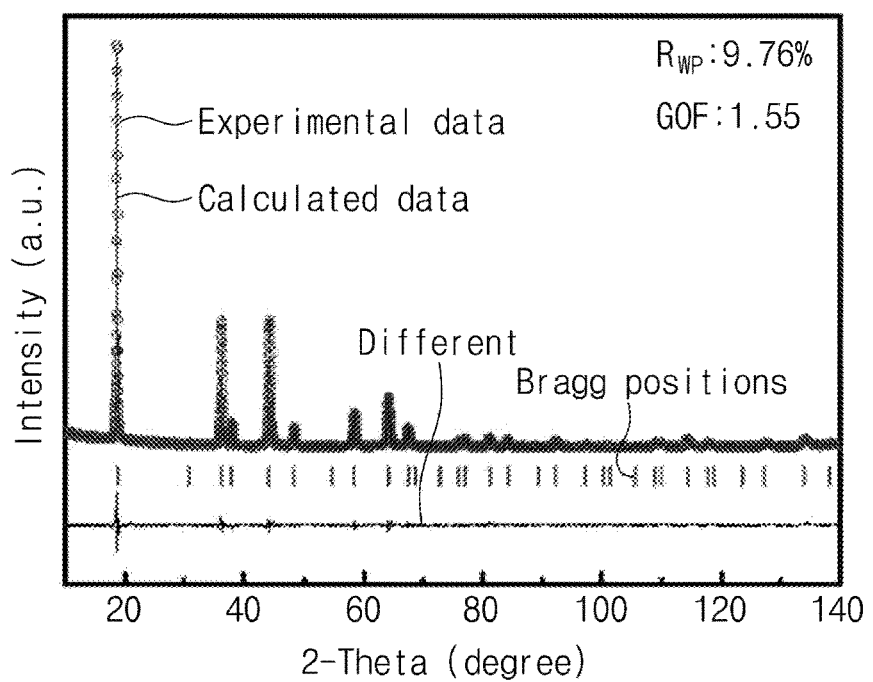

[Fig. 19]
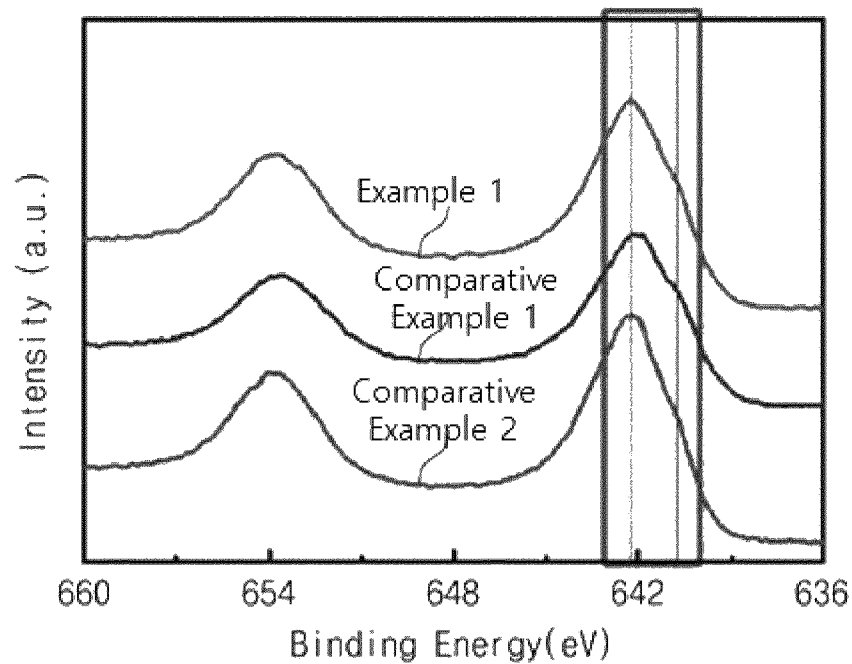
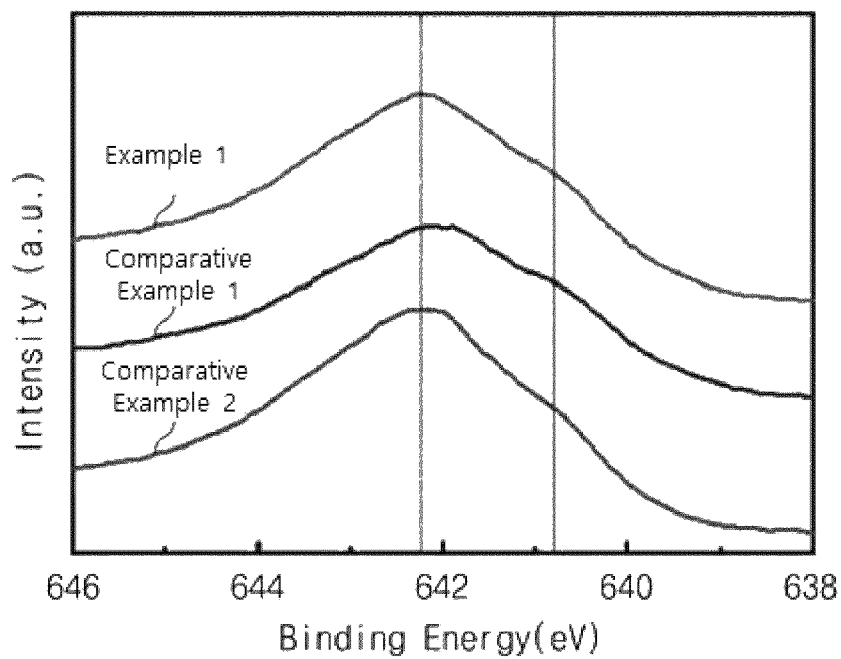

[Fig. 20]
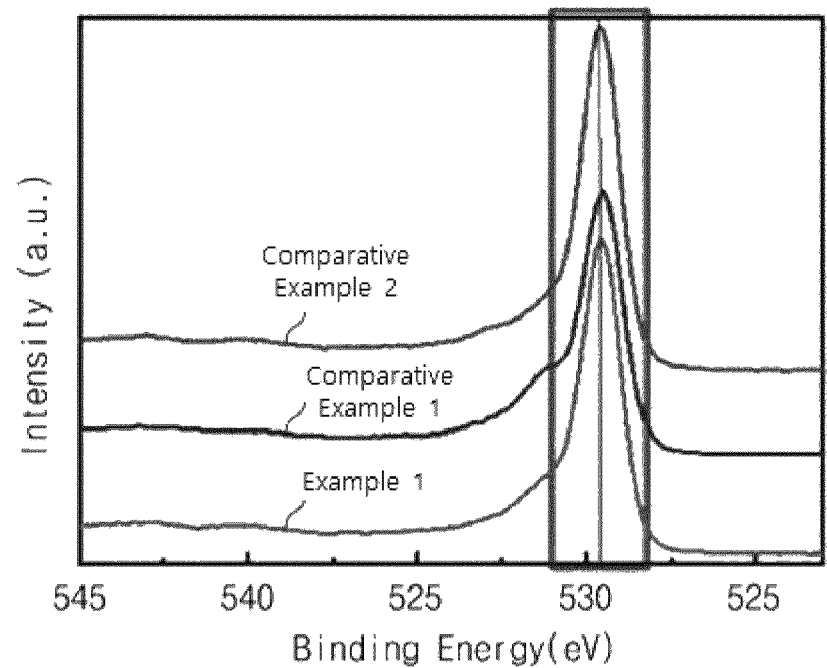
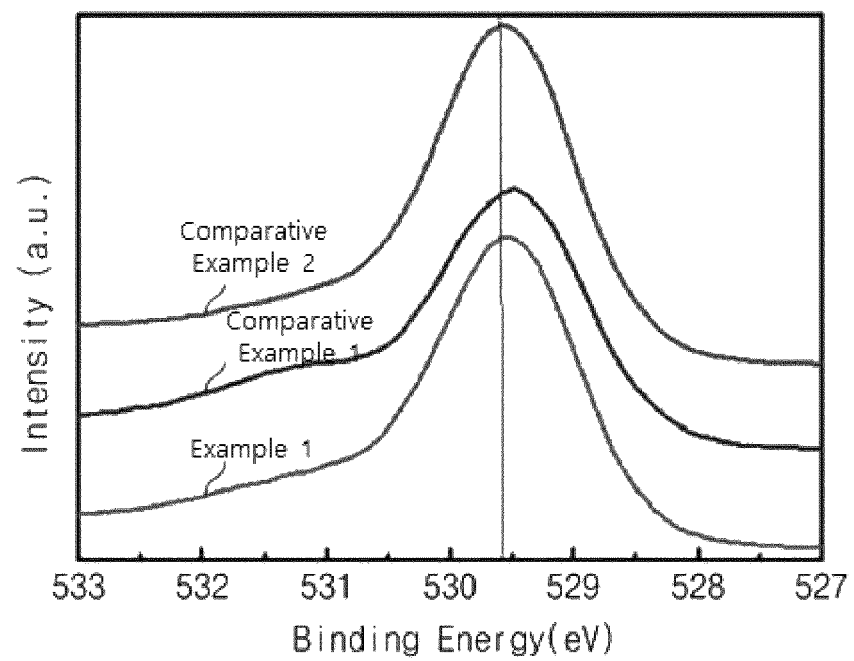

[Fig. 21]
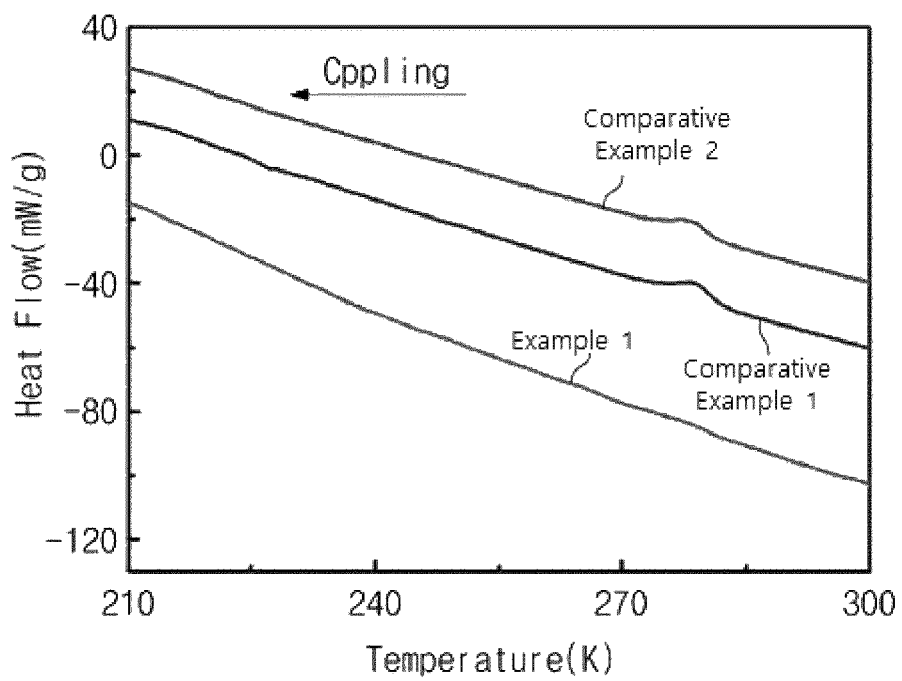

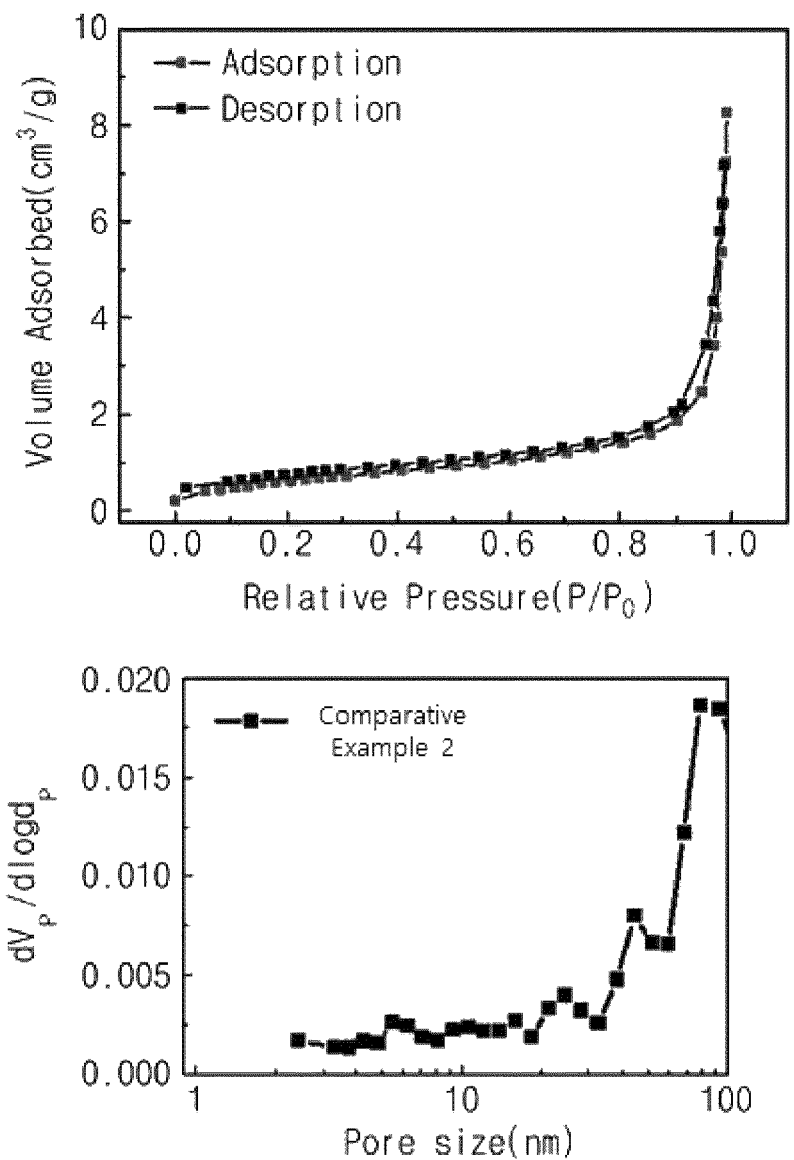
[Fig. 22]

[Fig. 23]
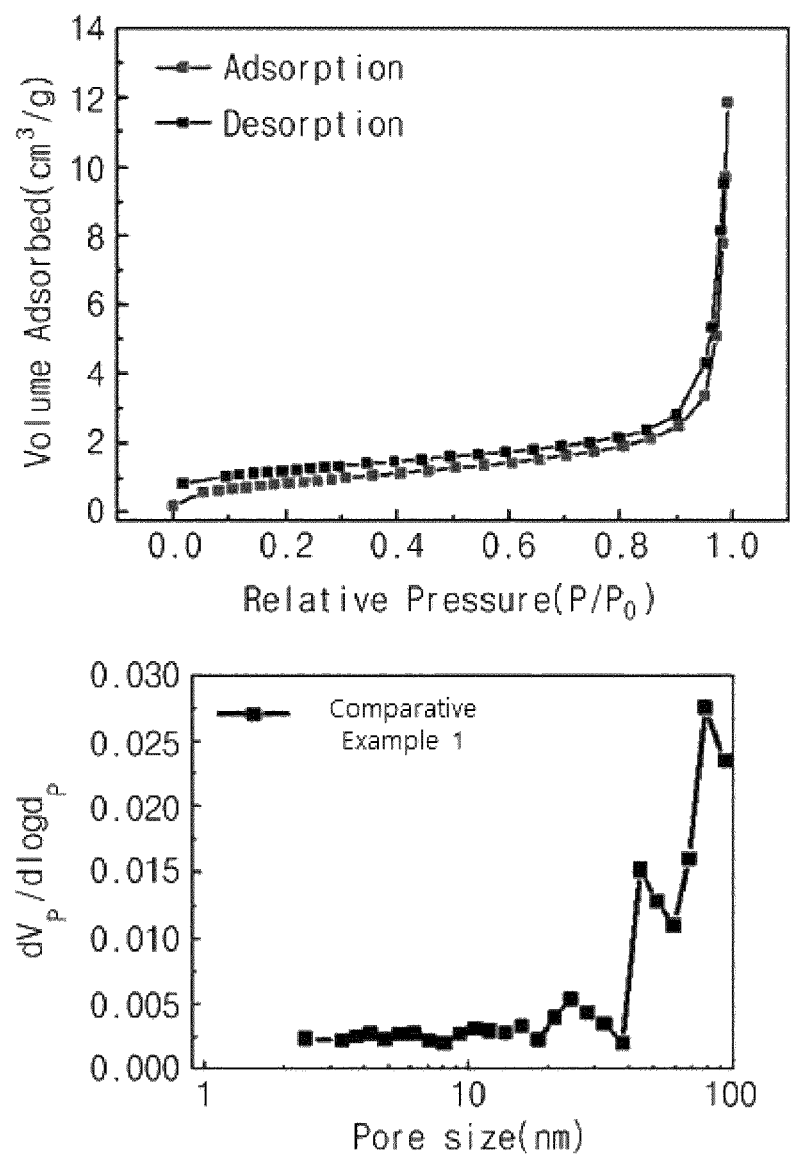

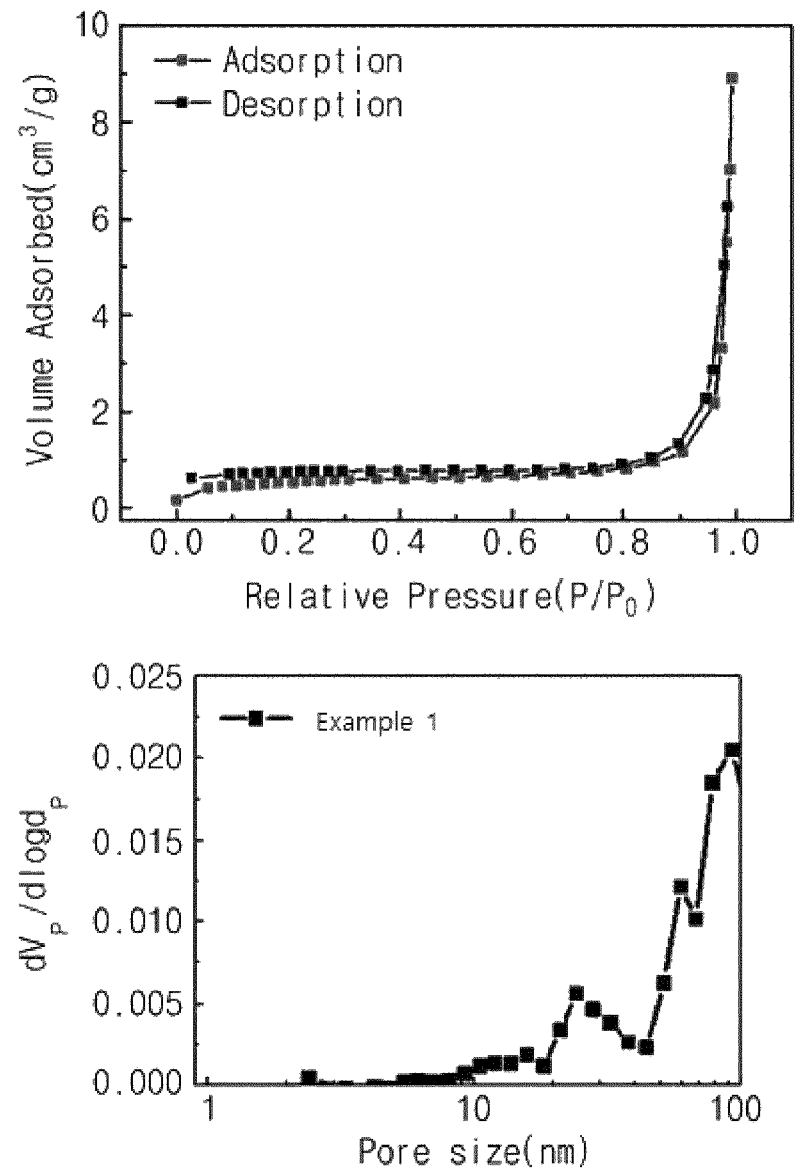
[Fig. 24]

[Fig. 25]
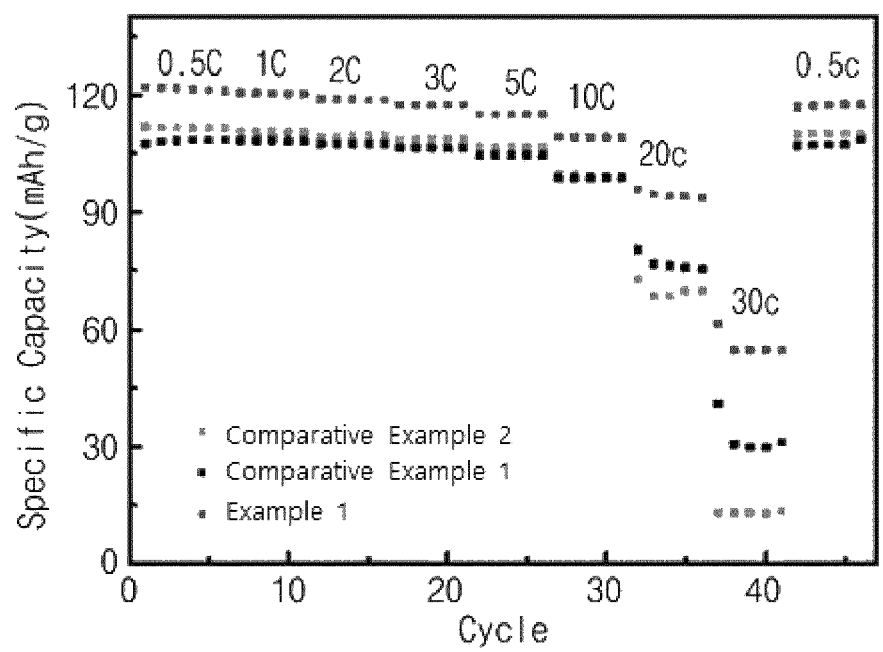

[Fig. 26]
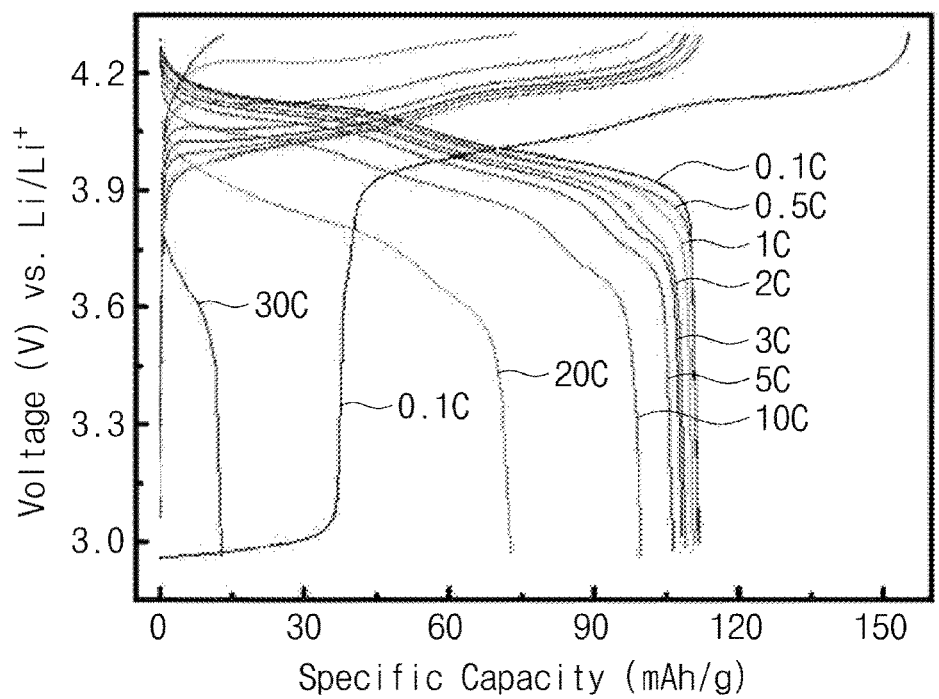

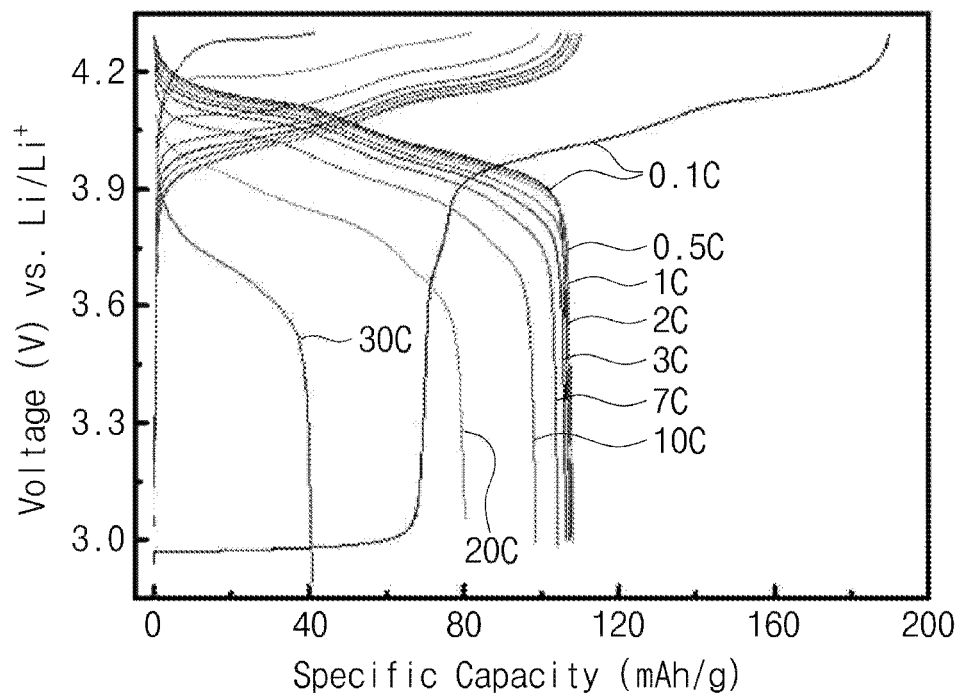
[Fig. 27]

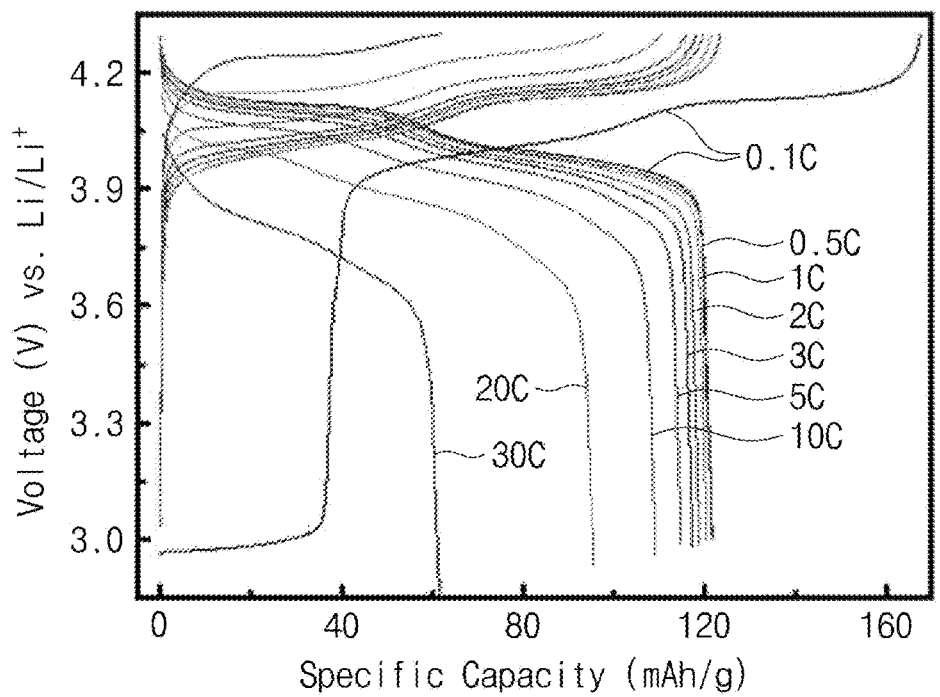
[Fig. 28]

[Fig. 29]
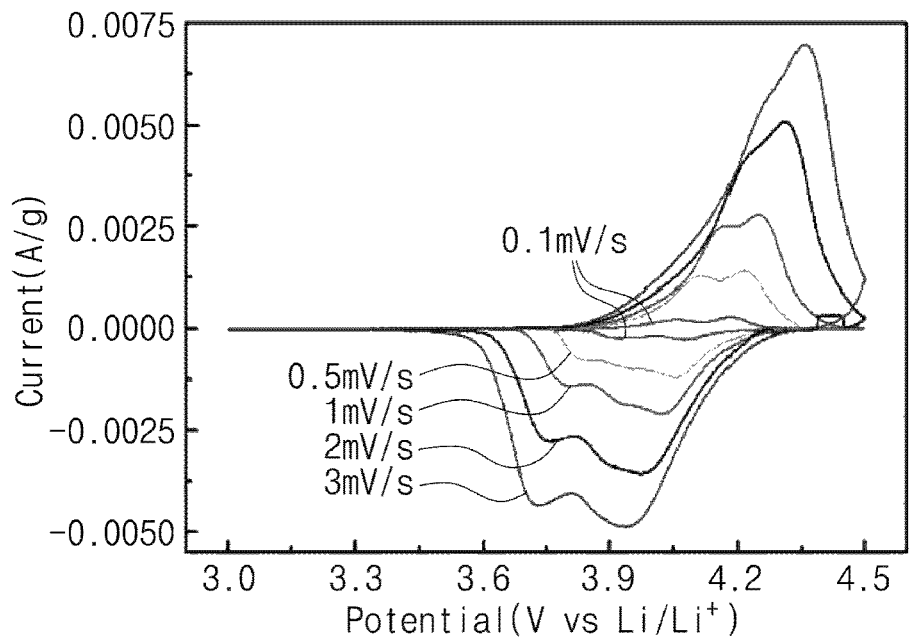
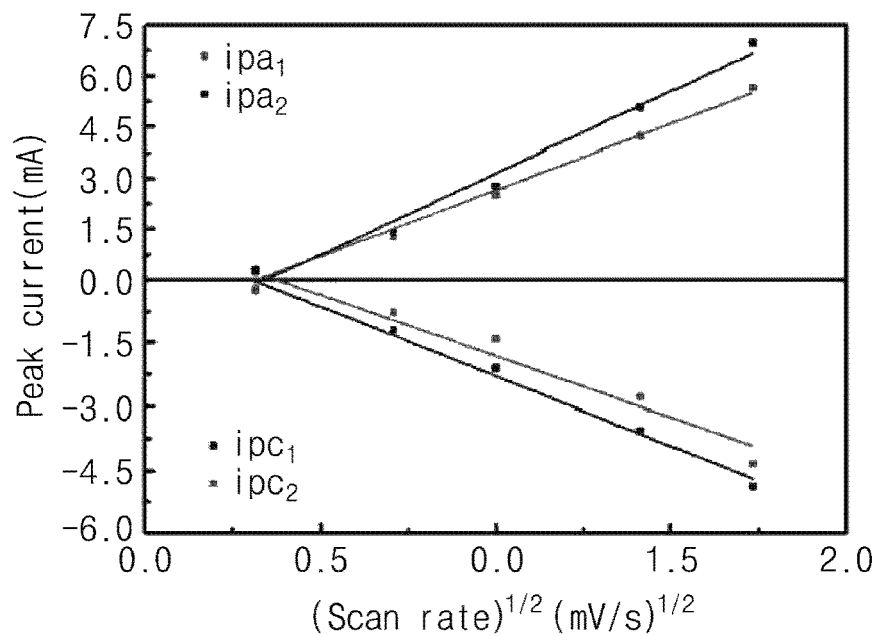

[Fig. 30]
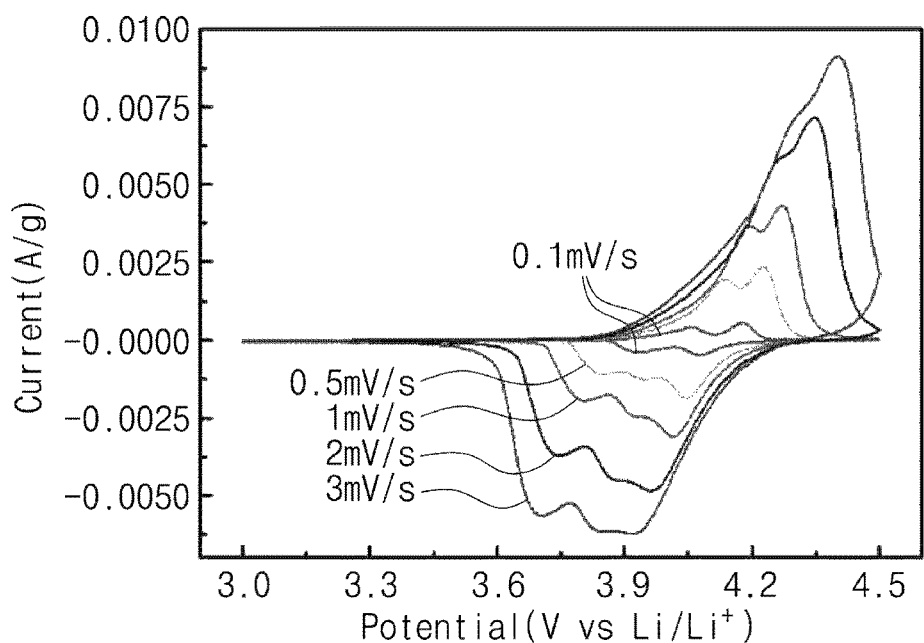
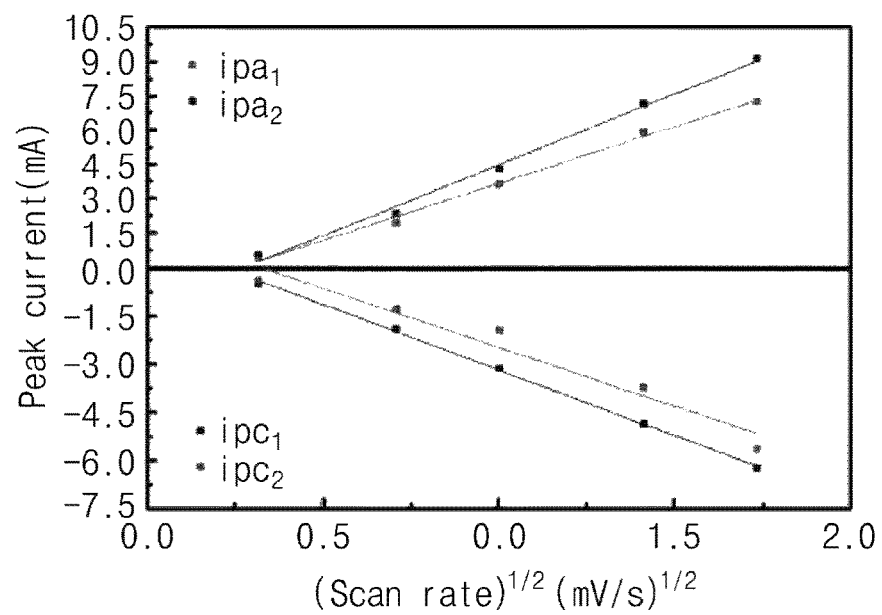

[Fig. 31]
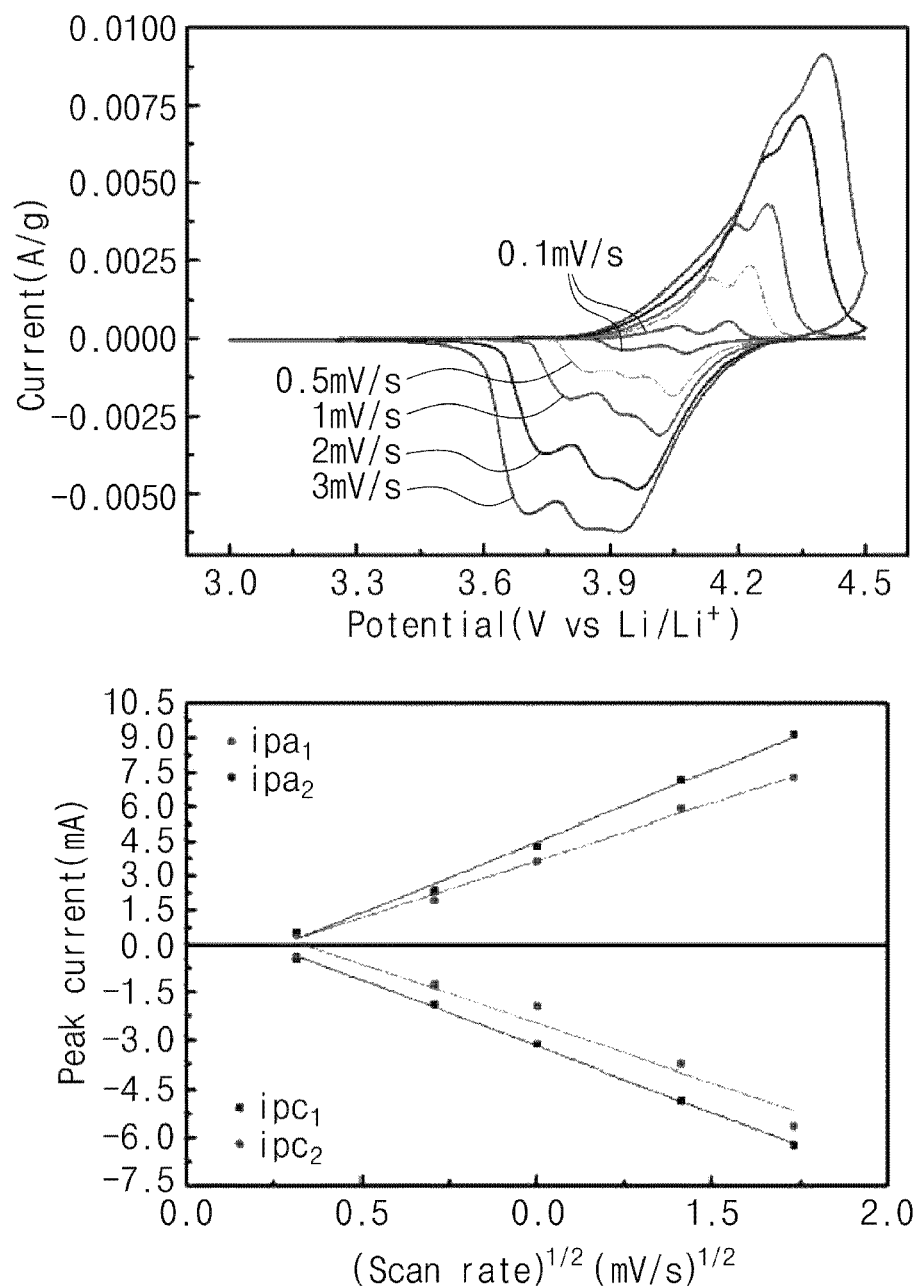

[Fig. 32]
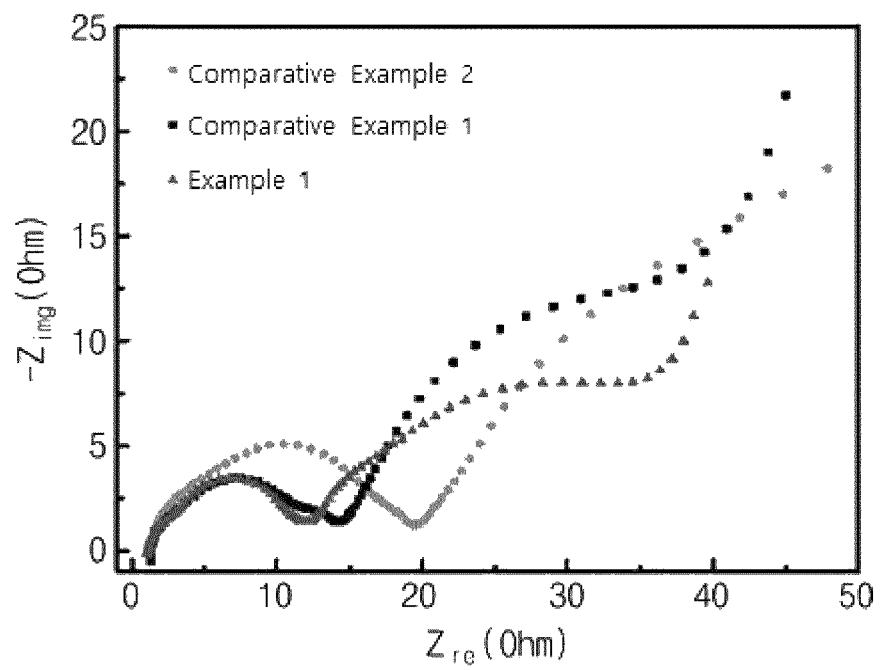

[Fig. 33]
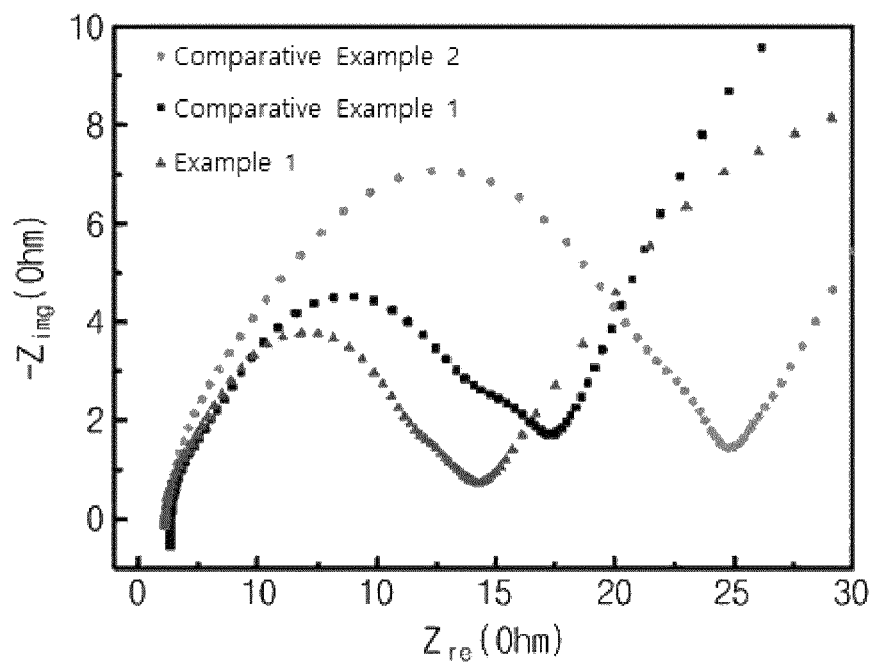

[Fig. 34]
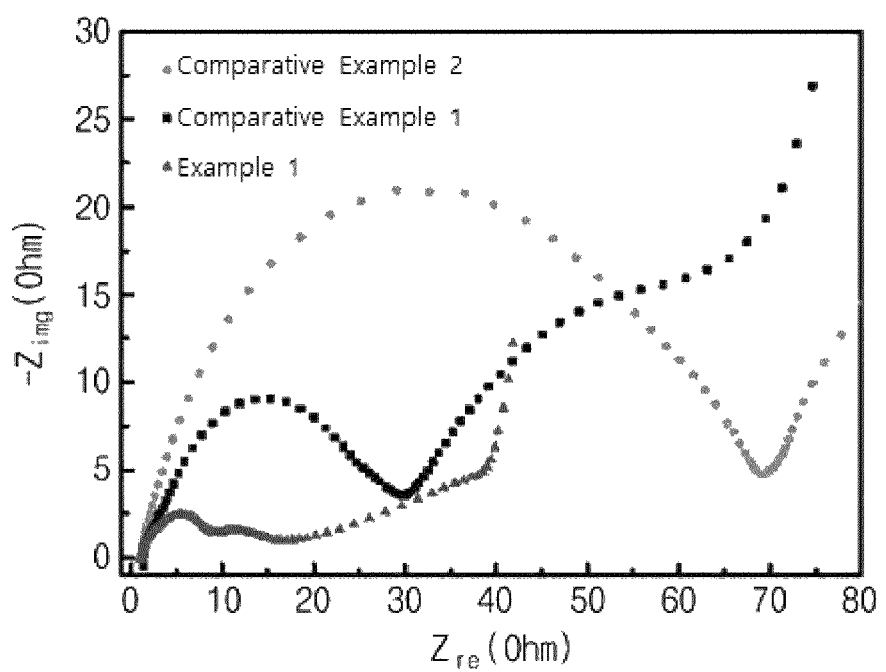

[Fig. 35]
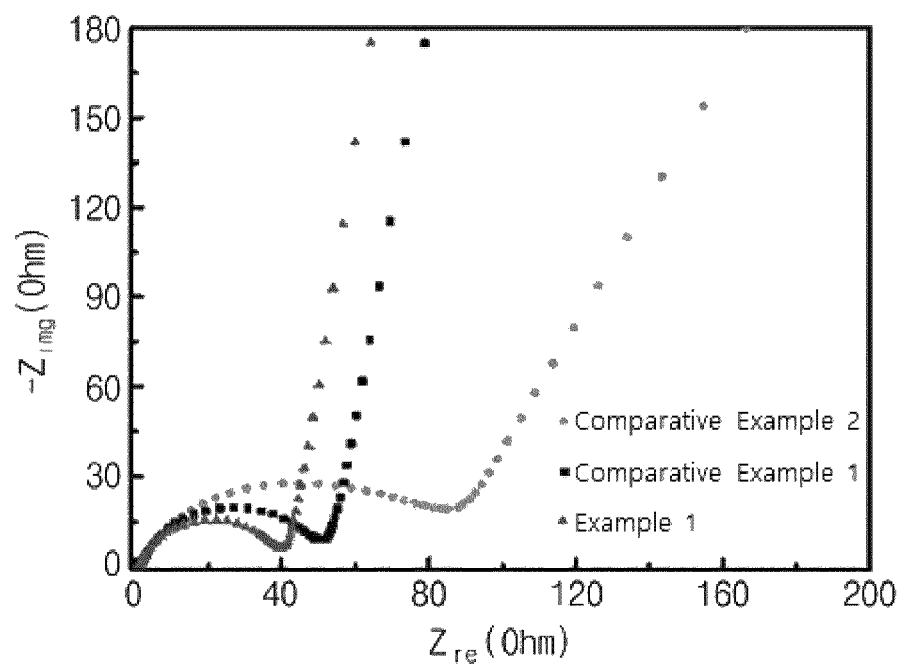

METHOD FOR PREPARING CATHODE ACTIVE MATERIAL

TECHNICAL FIELD

The present invention relates to a method for preparing a cathode active material, and more particularly to a method for preparing a cathode active material including a series of processes in which a first metal oxide is heat-treated in a nitrogen-containing gas atmosphere to prepare a second metal oxide, and then fired with lithium salt to prepare a lithium metal oxide.

BACKGROUND ART

With an increase in technology development and demand for portable electronic devices such as smartphones, notebooks, cameras and the like, there has been a rapidly growing demand for secondary batteries as an energy source. In line with the demand for the secondary batteries, there has been an active study on secondary batteries including an excellent cycle life and excellent charge/discharge properties. In particular, lithium secondary batteries have a high energy density and an operating voltage and thus have a long cycle life and a low self-discharge rate and have been widely commercialized. $LiCoO_2$ is mainly used as a cathode active material for secondary batteries, which is currently being actively used.

However, the lithium secondary battery using the $LiCoO_2$ as a cathode active material has a disadvantage in that a service life is rapidly reduced by repeated charge/discharge, and there is a risk of explosion due to structural instability, especially when used in high energy density applications. To overcome the above limitations, studies have been conducted on using various transition metal oxides such as $LiNiO_2$, $LiMnO_2$, $LiMn_2O_4$, $LiFePO_4$ and $Li(Ni_xCo_yMn_z)O_2$ as a cathode active material in the past.

For example, International Patent Publication No. WO2014193204 A1 discloses a method for preparing a cathode active material for a lithium secondary battery, including providing a transition metal oxide, mixing the transition metal oxide with a lithium compound, and heat-treating.

However, as the performance of lithium secondary batteries, including electrochemical properties and stability, has failed to meet the expectations of the present era, there is still a need to develop technologies for cathode active materials suitable for lithium secondary batteries.

DISCLOSURE

Technical Problem

One technical object of the present invention is to provide a method for preparing a cathode active material.

Another technical object of the present invention is to provide a method for preparing a cathode active material with an increase in diffusion coefficient of lithium.

Still another technical object of the present invention is to provide a method for preparing a cathode active material with a decrease in interfacial resistance.

Still another technical object of the present invention is to provide a method for preparing a cathode active material with excellent reversibility.

Still another technical object of the present invention is to provide a method for preparing a cathode active material with a fast rate of electrochemical reaction.

Still another technical object of the present invention is to provide a method for preparing a cathode active material with improved charge/discharge performance.

Still another technical object of the present invention is to provide a method for preparing a cathode active material with improved specific capacity.

The technical objects of the present application are not limited to the above.

Technical Solution

To solve the technical objects above, the present invention provides a method for preparing a cathode active material.

According to one embodiment, the method for preparing the cathode active material may include providing a first metal oxide, preparing a second metal oxide having an oxygen ratio lower than that of the first metal oxide by heat-treating the first metal oxide in a nitrogen-containing gas atmosphere; and preparing a lithium metal oxide by firing the second metal oxide and lithium salt.

According to one embodiment, the second metal oxide may include a core portion containing the second metal oxide, a shell portion surrounding the core portion and containing the second metal oxide, and a pore area provided between the core portion and the shell portion and surrounding the core portion.

According to one embodiment, the first metal oxide may include one transition metal element.

According to one embodiment, the second metal oxide may include a secondary particle obtained by aggregating a plurality of primary particles.

According to one embodiment, the providing of the first metal oxide may include mixing a metal source containing acid, and a powder source containing hydrogen carbonate in solvent to prepare a metal oxide precursor containing metal, carbon and oxygen, and heat-treating the metal oxide precursor to prepare the first metal oxide.

According to one embodiment, the first metal oxide may be heat-treated in the nitrogen-containing gas atmosphere to form a pore inside the second metal oxide.

According to one embodiment, a grain of the second metal oxide may have a size smaller than that of a grain of the first metal oxide.

According to one embodiment, the first metal oxide may be heat-treated at a first temperature, and the second metal oxide and lithium salt may be fired at a second temperature higher than the first temperature.

According to one embodiment, the first metal oxide may be heat-treated for a first time, and the second metal oxide and lithium salt may be fired for a second time longer than the first time.

Advantageous Effects

According to an embodiment of the present invention, a first metal oxide may be provided, then a second metal oxide having an oxygen ratio lower than that of the first metal oxide may be prepared by heat-treating the first metal oxide in a nitrogen-containing gas atmosphere, and then a lithium metal oxide may be prepared by firing the second metal oxide and a lithium salt.

The second metal oxide may include a core portion containing the second metal oxide, a shell portion surrounding the core portion and containing the second metal oxide, and a pore area provided between the core portion and the shell portion and surrounding the core portion. Accordingly, as lithium may be easily diffused inside the second metal oxide and a content of lithium may be increased inside the lithium metal oxide. Thus, if the lithium metal oxide is used as a cathode active material, the charge/discharge properties and life span properties of lithium secondary battery may be improved.

DESCRIPTION OF DRAWINGS

FIG. 1 is a flowchart for explaining a method for preparing a cathode active material according to an embodiment of the present invention.

FIG. 2 is a view for explaining a method for preparing a cathode active material according to an embodiment of the present invention.

FIG. 3 is a view showing an SEM picture of a metal oxide precursor according to Example 1 of the present invention.

FIG. 4 is a graph showing an XRD of a metal oxide precursor according to Example 1 of the present invention.

FIG. 5 is a view showing an SEM picture of a first metal oxide according to Example 1 of the present invention.

FIG. 6 is a graph showing an XRD of a first metal oxide according to Example 1 of the present invention.

FIG. 7 is a view showing SEM pictures of a first metal oxide according to Example 1 of the present invention.

FIG. 8 is a view showing SEM pictures of a second metal oxide according to Example 1 of the present invention.

FIG. 9 shows graphs for explaining BET analysis results of a first metal oxide according to Example 1 of the present invention.

FIG. 10 shows graphs for explaining BET analysis results of a second metal oxide according to Example 1 of the present invention.

FIG. 11 is a graph showing an XRD of a first metal oxide and a second metal oxide according to Example 1 of the present invention.

FIG. 12 is a view showing TEM pictures of a first metal oxide according to Example 1 of the present invention.

FIG. 13 is a view showing TEM pictures of a second metal oxide according to Example 1 of the present invention.

FIG. 14(a) is a view showing an SEM picture of a cathode active material according to Comparative Example 2.

FIG. 14(b) is a view showing an SEM picture of a cathode active material according to Comparative Example 1.

FIG. 14(c) is a view showing an SEM picture of a cathode active material according to Example 1 of the present invention.

FIG. 15(a) is a view showing TEM pictures of a cathode active material according to Comparative Example 2.

FIG. 15(b) is a view showing TEM pictures of a cathode active material according to Comparative Example 1.

FIG. 15(c) is a view showing TEM pictures of a cathode active material according to Example 1 of the present invention.

FIG. 16 is a Rietveld refinement graph of a cathode active material according to Comparative Example 2.

FIG. 17 is a Rietveld refinement graph of a cathode active material according to Comparative Example 1.

FIG. 18 is a Rietveld refinement graph of a cathode active material according to Example 1 of the present invention.

FIG. 19 is a graph showing Mn (2p) XPS analysis of cathode active materials according to Example 1 of the present invention and Comparative Examples 1 and 2.

FIG. 20 is a graph showing O XPS analysis of cathode active materials according to Example 1 of the present invention and Comparative Examples 1 and 2.

FIG. 21 is a graph showing DSC analysis of cathode active materials according to Example 1 of the present invention and Comparative Examples 1 and 2.

FIG. 22 shows graphs for explaining BET analysis results of a cathode active material according to Comparative Example 2.

FIG. 23 shows graphs for explaining BET analysis results of a cathode active material according to Comparative Example 1.

FIG. 24 shows graphs for explaining BET analysis results of a cathode active material according to Example 1 of the present invention.

FIG. 25 is a graph showing a measured discharge capacity of cathode active materials according to Example 1 of the present invention and Comparative Examples 1 and 2 according to the number of charge/discharge cycles.

FIG. 26 is a graph showing measured properties of constant current charge/discharge voltage of a cathode active material according to Comparative Example 2.

FIG. 27 is a graph showing measured properties of constant current charge/discharge voltage of a cathode active material according to Comparative Example 1.

FIG. 28 is a graph showing measured properties of constant current charge/discharge voltage of a cathode active material according to Example 1 of the present invention.

FIG. 29 is a graph showing a measured current of a cathode active material according to Comparative Example 2 in accordance with cyclic voltammetry.

FIG. 30 is a graph showing a measured current of a cathode active material according to Comparative Example 1 in accordance with cyclic voltammetry.

FIG. 31 is a graph showing a measured current of a cathode active material according to Example 1 of the present invention in accordance with cyclic voltammetry.

FIG. 32 is a graph showing a measured electrochemical impedance of cathode active materials according to Example 1 of the present invention and Comparative Examples 1 and 2 under the condition of 4.12 V/4.10 V.

FIG. 33 is a graph showing a measured electrochemical impedance of cathode active materials according to Example 1 of the present invention and Comparative Examples 1 and 2 under the condition of 4.06 V/4.04 V.

FIG. 34 is a graph showing a measured electrochemical impedance of cathode active materials according to Example 1 of the present invention and Comparative Examples 1 and 2 under the condition of 3.99 V/3.95 V.

FIG. 35 is a graph showing a measured electrochemical impedance of cathode active materials according to Example 1 of the present invention and Comparative Examples 1 and 2 under the condition of 3.60 V.

MODE FOR INVENTION

Hereinafter, preferred embodiments of the present invention will be described in detail with reference to the accompanying drawings. However, the technical spirit of the present invention is not limited to the embodiments, but may be realized in different forms. The embodiments introduced herein are provided to sufficiently deliver the spirit of the present invention to those skilled in the art so that the disclosed contents may become thorough and complete.

When it is mentioned in the specification that one element is on another element, it signifies that the first element may be directly formed on the second element or a third element may be interposed between the first element and the second element. Further, in the drawings, the thicknesses of the membrane and areas are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. Further, the terms "including" and "having" are used to designate that the features, the numbers, the steps, the elements, or combinations thereof described in the specification are present, and are not to be understood as excluding the possibility that one or more other features, numbers, steps, elements, or combinations thereof may be present or added.

Further, in the following description of the present invention, a detailed description of known functions or configurations incorporated herein will be omitted when it may make the subject matter of the present invention unnecessarily unclear.

FIG. 1 is a flow chart for explaining a method for preparing a cathode active material according to an embodiment of the present invention, and FIG. 2 is a view for explaining a method for preparing a cathode active material according to an embodiment of the present invention.

Referring to FIGS. 1 and 2, a first metal oxide 100 may be provided (S110).

The providing of the first metal oxide 100 may include mixing a metal source containing acid, and a powder source containing hydrogen carbonate in solvent to prepare a metal oxide precursor containing metal, carbon and oxygen, and heat-treating the metal oxide precursor to prepare the first metal oxide. According to one embodiment, the metal source containing acid may include $MnSO_4 5H_2O$, and the power source containing hydrogen carbonate may include $NH_4HCO_3$.

According to one embodiment, the $MnSO_4 5H_2O$ and $NH_4HCO_3$ may be mixed in solvent containing ethanol. The $MnSO_4 5H_2O$ and $NH_4HCO_3$ mixed in the solvent may be dried to prepare $MnCO_3$.

According to one embodiment, the metal oxide precursor may be heat-treated to prepare the first metal oxide 100. According to one embodiment, the first metal oxide 100 may include $Mn_2O_3$.

According to one embodiment, the first metal oxide 100 may include one transition metal element. For example, the first metal oxide 100 may include one of Mn, Co and Ni.

The first metal oxide 100 may be heat-treated in a nitrogen-containing gas atmosphere to prepare a second metal oxide 200 having an oxygen ratio lower than that of the first metal oxide 100. For example, the gas containing nitrogen may include ammonia ($NH_3$) gas. The first metal oxide 100 may be heat-treated in a $NH_3$ gas atmosphere to prepare the second metal oxide 200. The second metal oxide 200 may include $Mn_3O_4$. The heat-treatment may be performed at 300° C. for 30 minutes.

According to one embodiment, the first metal oxide 100 and the second metal oxide 200 may include a secondary particle 220 obtained by aggregating a plurality of primary particles 210.

According to one embodiment, a pore may be formed inside the second metal oxide 200 during a process in which the first metal oxide 100 is heat-treated in the nitrogen-containing gas atmosphere. In other words, the second metal oxide 200 may include a core portion containing the second metal oxide 200, a shell portion surrounding the core portion and containing the second metal oxide 200, and a pore area provided between the core portion and the shell portion and surrounding the core portion.

Further, after the first metal oxide 100 is heat-treated in a nitrogen-containing gas atmosphere, a grain of the second metal oxide 200 may have a size smaller than that of a grain of the first metal oxide 100. In other words, the second metal oxide 200 may have a polycrystal structure compared to the first metal oxide 100.

The second metal oxide 200 and lithium salt may be fired to prepare a lithium metal oxide 300 (S130). The preparing of the lithium metal oxide 300 may include preparing a mixture of the second metal oxide 200 and lithium salt and firing the mixture. According to one embodiment, a molar ratio between lithium (Li) and manganese (Mn) contained in the mixture may be 1.05:2.00. The mixture may be fired to prepare the lithium metal oxide 300. For example, $Mn_3O_4$ and $LiOH H_2O$ may be fired to prepare the lithium metal oxide 300. The lithium metal oxide 300 may include $LiMn_2O_4$. The firing may be performed at 700° C. for 10 hours.

According to an embodiment of the present invention, a temperature for firing the second metal oxide 200 and lithium salt may be higher than that of heat-treating the first metal oxide 100. Further, according to an embodiment of the present invention, a time of firing the second metal oxide 200 and lithium may be longer than that of heat-treating the first metal oxide 100.

As described above, according to an embodiment of the present invention, a pore may be formed inside the second metal oxide 200 in case of carrying out a series of processes, in which the first metal oxide 100 is heat-treated in the nitrogen-containing gas atmosphere to prepare the second metal oxide 200, after which the second metal oxide 200 and the lithium salt are fired to prepare the lithium metal oxide 300. In other words, the second metal oxide 200 may be prepared to include a core portion containing the second metal oxide 200, a shell portion surrounding the core portion and containing the second metal oxide 200, and a pore area provided between the core portion and the shell portion and surrounding the core portion.

Further, if the series of processes are performed, a grain of the second metal oxide 200 may have a size smaller than that of the first metal oxide 100. In other words, the second metal oxide 200 may be prepared to contain a polycrystal structure compared to the first metal oxide 100.

Unlike the embodiment of the present invention as described above, a pore may not be formed inside the metal oxide and a grain of the metal oxide may not have a smaller size, if the metal oxide is not heat-treated first in the nitrogen-containing gas atmosphere, but the metal oxide is heat-treated in the nitrogen-containing gas atmosphere after firing the metal oxide and lithium salt (that is, in case of not performing the series of processes as described above), or if the metal oxide is not heat-treated in the nitrogen-containing gas atmosphere. Accordingly, as lithium may not be easily diffused inside the metal oxide, and in case of a lithium secondary battery using the metal oxide as a cathode active material, a performance thereof may deteriorate.

As described above, however, in case of carrying out a series of processes according to an embodiment of the present invention, a pore may be formed inside the second metal oxide 200 and a grain of the second metal oxide 200 may have a smaller size. Thus, while the second metal oxide 200 and the lithium salt are fired, lithium may be easily diffused inside the second metal oxide 200 and a content of lithium may be increased inside the lithium oxide 300. Accordingly, in case of using the lithium metal oxide 300 as a cathode active material, the charge/discharge properties and life properties of the lithium secondary battery may be improved.

Hereinafter, specific experimental embodiments will be described with regard to the method for preparing the cathode active material according to an embodiment of the present invention.

Preparing of Cathode Active Material According to Example 1

Here, 1.45 g of $MnSO_4 5H_2O$ was provided as a metal source containing acid, and 4.74 g of $NH_4HCO_3$ was provided as a power source containing hydrogen carbonate. 210 mL of $H_2O$ and 21 mL of ethanol were provided, after which the metal source and the powder source were mixed and stirred at room temperature for two hours to prepare a mixed solution. The mixed solution was centrifuged twice with DI-water (8500 rpm, 10 minutes), washed twice with ethanol, and dried in an oven at 60° C. for 12 hours to prepare $MnCO_3$.

The $MnCO_3$ was heat-treated at 800° C. for two hours to prepare $Mn_2O_3$.

Further, 0.1 g of the $Mn_2O_3$ was charged into a tube furnace having a $NH_3$ gas environment, after which the tube furnace was heated up to 300° C. at a heating rate of 10° C./min and maintained at 300° C. for 30 minutes. After the holding time, the tube furnace was cooled down to room temperature, after which $N_2$ gas was flowed into the tube furnace to remove the $NH_3$ gas therefrom, thereby preparing $Mn_3O_4$.

In addition, 0.1 g of the $Mn_3O_4$ and 0.030 g of LiOH $H_2O$ were put into a mortar and pulverized to prepare powder. The powder was charged into a tube furnace having an $O_2$ gas environment, after which the tube furnace was heated up to 700° C. at a heating rate of 10° C./min and maintained at 700° C. for 10 hours. After the holding time, the tube furnace was cooled down to room temperature, after which $N_2$ gas was flowed into the tube furnace to remove the $O_2$ gas therefrom, thereby preparing a cathode active material according to Example 1.

Preparing of Cathode Active Material According to Comparative Example 1

A cathode active material was prepared by the same method as described above in Example 1. However, before charging $Mn_2O_3$ into a tube furnace having a $MH_3$ gas environment, 0.1 g of the $Mn_2O_3$ and 0.029 g of LiOH $H_2O$ were put into a mortar and pulverized to prepare powder. The powder was charged into a tube furnace having an $O_2$ gas environment, after which the tube furnace was heated up to 700° C. at a heating rate of 10° C./min and maintained at 700° C. for 10 hours. After the holding time, the tube furnace was cooled down to room temperature, after which $N_2$ gas was flowed into the tube furnace to remove the $O_2$ gas therefrom, thereby preparing $LiMn_2O_4$.

Further, 0.1 g of the $LiMn_2O_4$ was charged into a tube furnace having a $NH_3$ gas environment, after which the tube furnace was heated up to 180° C. at a heating rate of 10° C./min and maintained at 180° C. for one hour. After the holding time, the tube furnace was cooled down to room temperature, after which $N_2$ gas was flowed into the tube furnace to remove the $NH_3$ gas therefrom, thereby preparing a cathode active material according to Comparative Example 1.

Preparing of Cathode Active Material According to Comparative Example 2

A cathode active material was prepared by the same method as described above in Example 1. However, instead of charging $Mn_2O_3$ into a tube furnace having a $MH_3$ gas environment, 0.1 g of the $Mn_2O_3$ and 0.029 g of LiOH $H_2O$ were put into a mortar and pulverized to prepare powder. The powder was charged into a tube furnace having an $O_2$ gas environment, after which the tube furnace was heated up to 700° C. at a heating rate of 10° C./min and maintained at 700° C. for 10 hours. After the holding time, the tube furnace was cooled down to room temperature, after which $N_2$ gas was flowed into the tube furnace to remove the $O_2$ gas therefrom, thereby preparing a cathode active material according to Comparative Example 2.

FIG. 3 is a view showing an SEM picture of a metal oxide precursor according to Example 1 of the present invention, and FIG. 4 is a graph showing an XRD of a metal oxide precursor according to Example 1 of the present invention. Further, FIG. 5 is a view showing an SEM picture of a first metal oxide according to Example 1 of the present invention, and FIG. 6 is a graph showing an XRD of a first metal oxide according to Example 1 of the present invention.

Referring to FIGS. 3 to 6, it may be confirmed from the SEM pictures that the first metal oxide prepared by heat-treating the metal oxide precursor at 800° C. for two hours shows a concave and convex shape on a particle surface compared to before heat-treating the metal oxide precursor. Further, it can be confirmed through XRD that a peak of Mn, C and O is clearly observed from the metal oxide precursor, and it can be conformed that the peak of C is decreased after preparing the first metal oxide by heat-treating the metal oxide precursor at 800° C. for two hours.

FIG. 7 is a view showing SEM pictures of a first metal oxide according to Example 1 of the present invention, and FIG. 8 is a view showing SEM pictures of a second metal oxide according to Example 1 of the present invention. Further, FIG. 9 shows graphs for explaining BET analysis results of a first metal oxide according to Example 1 of the present invention, FIG. 10 shows graphs for explaining BET analysis results of a second metal oxide according to Example 1 of the present invention, and FIG. 11 is a graph showing an XRD of a first metal oxide and a second metal oxide according to Example 1 of the present invention.

Referring to FIGS. 7 to 10, a size, a specific surface area and a total pore volume of grains of the first metal oxide and the second metal oxide according to Example 1 of the present invention may be summarized as shown in the following [Table 1].

TABLE 1

|  | First metal oxide ($Mn_2O_3$) | Second metal oxide ($Mn_3O_4$) |
|---|---|---|
| Grain size[nm] | 96.97 | 27.43 |
| $a_{s, BET}$ [$m^2$/g] | 5.397 | 5.752 |
| Total pore volume [$cm^3$/g] | 0.07386 | 0.06871 |

As can be understood from [Table 1] and FIGS. 7 to 10, it can be confirmed that a grain of the second metal oxide has a size about 3.5 times smaller than that of a size of the first metal oxide, a specific surface area larger than that of the first metal oxide by about 0.35 m$^2$/g, and a total pore volume smaller than that of the first metal oxide by about 0.005 cm$^3$/g. In other words, as described above, it signifies that the grain of the second metal oxide prepared by heat-treating the first metal oxide in a nitrogen-containing gas atmosphere has a smaller size compared to the first metal oxide and a pore is formed inside the second metal oxide. Further, referring to FIG. 11, it can be confirmed that a nitrogen peak is observed in an XRD of the second metal oxide prepared by heat-treating the first metal oxide in a nitrogen-containing gas atmosphere.

FIG. 12 is a view showing TEM pictures of a first metal oxide according to Example 1 of the present invention, and FIG. 13 is a view showing TEM pictures of a second metal oxide according to Example 1 of the present invention.

Referring to FIGS. 12 and 13, it can be confirmed that a pore, not observed inside the first metal oxide, is observed inside the second metal oxide prepared after heat-treating the first metal oxide in a nitrogen-containing gas atmosphere. Further, it can be confirmed that the second metal oxide is observed to include a core portion containing the second metal oxide, a shell portion surrounding the core portion and containing the second metal oxide, and a pore area provided between the core portion and the shell portion and surrounding the core portion.

FIG. 14(a) is a view showing an SEM picture of a cathode active material according to Comparative Example 2, FIG. 14(b) is a view showing an SEM picture of a cathode active material according to Comparative Example 1, and FIG. 14(c) is a view showing an SEM picture of a cathode active material according to Example 1 of the present invention. FIG. 15(a) is a view showing TEM pictures of a cathode active material according to Comparative Example 2, FIG. 15(b) is a view showing TEM pictures of a cathode active material according to Comparative Example 1, and FIG. 15(c) is a view showing TEM pictures of a cathode active material according to Example 1 of the present invention.

Referring to FIGS. 14 and 15, it can be confirmed that a particle surface state of cathode active materials according to Comparative Example 2, Comparative Example 1 and Example 1 of the present invention has a similar shape. From the above results, it can be understood that the particle surface state of cathode active materials according to Comparative Example 2, Comparative Example 1 and Example 1 of the present invention is substantially the same regardless of being heat-treated in the nitrogen-containing gas atmosphere.

FIG. 16 is a Rietveld refinement graph of a cathode active material according to Comparative Example 2, FIG. 17 is a Rietveld refinement graph of a cathode active material according to Comparative Example 1, and FIG. 18 is a Rietveld refinement graph of a cathode active material according to Example 1 of the present invention.

Referring to FIGS. 16 to 18, a crystal structure parameter, a grain size and a strain value of cathode active materials according to Comparative Example 2, Comparative Example 1 and Example 1 of the present invention may be summarized as shown in the following [Table 2].

TABLE 2

|  | a-axis [Å] | Grain size [Å] | Strain [%] |
|---|---|---|---|
| Comparative Example 2 | 8.2231 | 82.73 | 0.014 |
| Comparative Example 1 | 8.2256 | 86.51 | 0.015 |
| Example 1 | 8.2038 | 77.04 | 0.067 |

As can be understood from [Table 2] and FIGS. 16 to 18, it can be confirmed that a grain of the cathode active material according to Example 1 of the present invention has a smaller size compared to a grain of the cathode active materials according to Comparative Example 2 and Comparative Example 1. Further, it can be confirmed that an a-axis of the cathode active material according to Example 1 of the present invention has a shorter length compared to an a-axis of the cathode active materials according to Comparative Example 2 and Comparative Example 1.

As described above, the cathode active material according to Example 1 of the present invention is prepared through a series of processes, in which the first metal oxide is heat-treated in a nitrogen-containing gas atmosphere to prepare the second metal oxide, after which the second metal oxide and the lithium salt are fired to prepare the lithium metal oxide. Accordingly, the cathode active material according to Example 1 of the present invention may show an increase in a content of lithium in the cathode active material due to the property having a grain size smaller than that of the cathode active materials of Comparative Examples 1 and 2.

Further, considering that an a-axis of the cathode active material according to Example 1 of the present invention has a shorter length compared to an a-axis of the cathode active materials according to Comparative Example 2 and Comparative Example 1, it can be understood that the content of lithium is increased inside the cathode active material according to Example 1 of the present invention, compared to the cathode active materials according to Comparative Example 2 and Comparative Example 1.

FIG. 19 is a graph showing Mn (2p) XPS analysis of cathode active materials according to Example 1 of the present invention and Comparative Examples 1 and 2, and FIG. 20 is a graph showing O XPS analysis of cathode active materials according to Example 1 of the present invention and Comparative Examples 1 and 2.

Referring to FIG. 19, it can be observed that the cathode active materials according to Example 1 of the present invention and Comparative Examples 1 and 2 show Mn (2p) peaks similar to each other. Further, referring to FIG. 20, it can be observed that the cathode active materials according to Example 1 of the present invention and Comparative Examples 1 and 2 show O peaks similar to each other. In other words, it signifies that surface states of the cathode active materials according to Example 1 of the present invention and Comparative Examples 1 and 2 are substantially the same.

FIG. 21 is a graph showing DSC analysis of cathode active materials according to Example 1 of the present invention and Comparative Examples 1 and 2.

Referring to FIG. 21, it can be confirmed that a peak of the cathode active material according to Example 1 of the present invention is not observed between 270 and 285 K, while a peak of the cathode active materials according to Comparative Examples 1 and 2 is observed therebetween. In other words, it signifies that Jahn-teller distortion did not occur to the cathode active material according to Example 1 of the present invention, as an amount of Li grows to increase an oxidation number of Mn. Accordingly, unlike the cathode active materials according to Comparative Examples 1 and 2, it can be understood that a distortion did not occur to a crystal structure of the cathode active material according to Example 1 of the present invention.

FIG. 22 shows graphs for explaining BET analysis results of a cathode active material according to Comparative Example 2, FIG. 23 shows graphs for explaining BET analysis results of a cathode active material according to Comparative Example 1, and FIG. 24 shows graphs for explaining BET analysis results of a cathode active material according to Example 1 of the present invention.

Referring to FIGS. 22 to 24, a specific surface area, a total pore volume and an average pore size of cathode active materials according to Comparative Example 2, Comparative Example 1 and Example 1 of the present invention may be summarized as shown in the following [Table 3].

TABLE 3

|  | $a_{s,\ BET}$ [m$^2$/g] | Total pore volume [cm$^3$/g] | Mean pore diameter [nm] |
| --- | --- | --- | --- |
| Comparative Example 2 | 2.319 | 0.01247 | 21.50 |
| Comparative Example 1 | 3.183 | 0.01783 | 22.41 |
| Example 1 | 1.906 | 0.01191 | 24.98 |

As can be understood from [Table 3] and FIGS. 22 to 24, it can be confirmed that a specific surface area and a total pore volume of the cathode active material according to Example 1 of the present invention are smaller and an average pore size thereof is larger compared to the cathode active materials according to Comparative Example 2 and Comparative Example 1. As described above, the cathode active material according to Example 1 of the present invention is prepared through a series of processes, in which the first metal oxide is heat-treated in a nitrogen-containing gas atmosphere to prepare the second metal oxide, after which the second metal oxide and the lithium salt are fired to prepare the lithium metal oxide. Accordingly, the cathode active material according to Example 1 of the present invention may form a pore structure different from that of the cathode active materials according to Comparative Example 2 and Comparative Example 1.

FIG. 25 is a graph showing a measured discharge capacity of cathode active materials according to Example 1 of the present invention and Comparative Examples 1 and 2 according to the number of charge/discharge cycles, FIG. 26 is a graph showing measured properties of constant current charge/discharge voltage of a cathode active material according to Comparative Example 2, FIG. 27 is a graph showing measured properties of constant current charge/discharge voltage of a cathode active material according to Comparative Example 1, and FIG. 28 is a graph showing measured properties of constant current charge/discharge voltage of a cathode active material according to Example 1 of the present invention.

Referring to FIGS. 25 to 28, it can be confirmed that the cathode active material according to Comparative Example 2 has a larger discharge capacity compared to the cathode active material according to Comparative Example 1 under the condition of 0.5 to 10 C, but the cathode active material according to Comparative Example 1 has a larger discharge capacity compared to the cathode active material according to Comparative Example 2 under the condition of 20 to 30 C. Further, when comparing the cathode active material according to Example 1 of the present invention with both the cathode active material according to Comparative Example 1 and the cathode active material according to Comparative Example 2, it can be confirmed that the cathode active material according to Example 1 of the present invention has the largest discharge capacity and the most excellent properties according to charge/discharge cycles under the condition of 0.5 to 30 C.

FIG. 29 is a graph showing a measured current of a cathode active material according to Comparative Example 2 in accordance with cyclic voltammetry, FIG. 30 is a graph showing a measured current of a cathode active material according to Comparative Example 1 in accordance with cyclic voltammetry, and FIG. 31 is a graph showing a measured current of a cathode active material according to Example 1 of the present invention in accordance with cyclic voltammetry.

Referring to FIGS. 29 to 31, a diffusion coefficient of lithium ion of cathode active materials according to Comparative Example 2, Comparative Example 1 and Example 1 of the present invention may be summarized as shown in the following [Table 4].

TABLE 4

| $D_{Li}$ (cm$^2$/s) | ipa$_1$ | ipa$_2$ | ipa$_1$ | ipa$_2$ |
| --- | --- | --- | --- | --- |
| Comparative Example 2 | 3.71 × 10$^{-7}$ | 5.66 × 10$^{-7}$ | 2.63 × 10$^{-7}$ | 2.04 × 10$^{-7}$ |
| Comparative Example 1 | 6.00 × 10$^{-7}$ | 9.38 × 10$^{-7}$ | 4.16 × 10$^{-7}$ | 3.34 × 10$^{-7}$ |
| Example 1 | 6.74 × 10$^{-7}$ | 1.04 × 10$^{-7}$ | 4.57 × 10$^{-7}$ | 3.68 × 10$^{-7}$ |

As can be understood from [Table 4] and FIGS. 29 to 31, it can be confirmed that the cathode active material according to Example 1 of the present invention has a larger diffusion coefficient of lithium ion compared to the cathode active materials according to Comparative Example 2 and Comparative Example 1. In other words, it signifies that the cathode active material according to Example 1 of the present invention has a smaller interfacial resistance and is easier to have lithium ions diffused compared to the cathode active materials according to Comparative Examples 1 and 2. Further, it can be confirmed from FIG. 38 that the cathode active material according to Example 1 of the present invention has the most excellent reversibility under the condition of 0.1 mV/s.

FIG. 32 is a graph showing a measured electrochemical impedance of cathode active materials according to Example 1 of the present invention and Comparative Examples 1 and 2 under the condition of 4.12 V/4.10 V, FIG. 33 is a graph showing a measured electrochemical impedance of cathode active materials according to Example 1 of the present invention and Comparative Examples 1 and 2 under the condition of 4.06 V/4.04 V, FIG. 34 is a graph showing a measured electrochemical impedance of cathode active materials according to Example 1 of the present invention and Comparative Examples 1 and 2 under the condition of 3.99 V/3.95 V, and FIG. 35 is a graph showing a measured electrochemical impedance of cathode active materials according to Example 1 of the present invention and Comparative Examples 1 and 2 under the condition of 3.60 V.

Referring to FIGS. 32 to 35, it can be confirmed that the cathode active materials according to Comparative Examples 1 and 2 have a larger Rct value compared to the cathode active material according to Example 1 of the present invention, and thus the cathode active material according to Example 1 of the present invention has a faster electrochemical reaction rate, thereby having an excellent performance as a cathode material of lithium secondary batteries.

Although the invention has been described in detail with reference to exemplary embodiments, the scope of the present invention is not limited to a specific embodiment and should be interpreted by the attached claims. In addition, those skilled in the art should understand that many modifications and variations are possible without departing from the scope of the present invention.

INDUSTRIAL APPLICABILITY

A cathode active material according to an embodiment of the present invention and a method for preparing the same may be utilized in various fields of industry such as mobile electronic equipment, electric cars, energy storage systems, etc.

The invention claimed is:

1. A method for preparing a cathode active material, the method comprising:
mixing a metal source containing acid and a powder source containing hydrogen carbonate in solvent to produce a metal oxide precursor containing metal, carbon, and oxygen;
heat-treating the metal oxide precursor to produce a first metal oxide having a first oxygen ratio;
heat-treating the first metal oxide at a first temperature, in a nitrogen-containing gas atmosphere that includes ammonia, to produce a second metal oxide having a second oxygen ratio that is lower than the first oxygen ratio, wherein the second metal oxide includes
a core portion containing the second metal oxide,
a shell portion surrounding the core portion and containing the second metal oxide, and
a pore area that surrounds the core portion and that is provided between the core portion and the shell portion;
pulverizing a mixture of the second metal oxide and LiOH $H_2O$ into a powder; and
heat-treating the powder at a second temperature, in an $O_2$ gas environment, wherein heat-treating the powder causes lithium to diffuse into the second metal oxide, thereby producing a lithium metal oxide as a cathode active material, and wherein the second temperature is higher than the first temperature.

2. The method of claim 1, wherein the first metal oxide includes $Mn_2O_3$ and the second metal oxide includes $Mn_3O_4$.

3. The method of claim 1, wherein the first metal oxide includes one transition metal element.

4. The method of claim 1, wherein the second metal oxide includes a secondary particle obtained by aggregating a plurality of primary particles.

5. The method of claim 1, wherein:
the metal source containing acid comprises $MnSo_4$ $5H_2O$;
the powder source containing hydrogen carbonate comprises $NH_4HCO_3$; and
the solvent comprises ethanol.

6. The method of claim 1, wherein the first metal oxide is heat-treated in the nitrogen-containing gas atmosphere at 300° C. for 30 minutes.

7. The method of claim 1, wherein a grain of the second metal oxide has a size smaller than a size of a grain of the first metal oxide.

8. The method of claim 1, wherein the first metal oxide is heat-treated for a first time, and the powder is heat-treated for a second time longer than the first time.

9. A method for preparing a cathode active material, the method comprising:
mixing a metal source containing acid and a powder source containing hydrogen carbonate in solvent to produce a metal oxide precursor containing metal, carbon, and oxygen;
heat-treating the metal oxide precursor to produce a first metal oxide having a first oxygen ratio;
heat-treating the first metal oxide at a first temperature in an ammonia atmosphere to produce a second metal oxide having a second oxygen ratio that is lower than the first oxygen ratio;
pulverizing a mixture of the second metal oxide and LiOH $H_2O$ into a powder; and
heat-treating the powder at a second temperature, in an $O_2$ gas environment, wherein heat-treating the powder produces a lithium metal oxide as a cathode active material, and wherein the second temperature is higher than the first temperature.

10. The method of claim 9, wherein the first metal oxide is heat-treated in the ammonia atmosphere to form a pore inside the second metal oxide.

11. The method of claim 9, wherein the second metal oxide includes:
a core portion containing the second metal oxide;
a shell portion surrounding the core portion and containing the second metal oxide; and
a pore area provided between the core portion and the shell portion and surrounding the core portion.

12. The method of claim 9, wherein the first metal oxide includes $Mn_2O_3$.

13. The method of claim 9, wherein:
the first metal oxide includes $Mn_2O_3$; and
the second metal oxide includes $Mn_3O_4$.

* * * * *